US011564239B2

(12) United States Patent
Lee et al.

(10) Patent No.: US 11,564,239 B2
(45) Date of Patent: Jan. 24, 2023

(54) METHOD AND APPARATUS FOR TRANSMISSION PRIORITIZATION IN WIRELESS COMMUNICATION SYSTEM

(71) Applicant: LG ELECTRONICS INC., Seoul (KR)

(72) Inventors: Youngdae Lee, Seoul (KR); Giwon Park, Seoul (KR); Seungmin Lee, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/643,800

(22) Filed: Dec. 10, 2021

(65) Prior Publication Data

US 2022/0104209 A1 Mar. 31, 2022

Related U.S. Application Data

(63) Continuation of application No. PCT/KR2020/015603, filed on Nov. 9, 2020.

(30) Foreign Application Priority Data

Nov. 7, 2019 (KR) ........................ 10-2019-0142063

(51) Int. Cl.
*H04W 72/08* (2009.01)
*H04W 72/02* (2009.01)
(Continued)

(52) U.S. Cl.
CPC ......... *H04W 72/085* (2013.01); *H04W 72/02* (2013.01); *H04W 72/10* (2013.01); *H04W 80/02* (2013.01); *H04W 92/18* (2013.01)

(58) Field of Classification Search
CPC ............... H04W 72/085; H04W 72/02; H04W 72/10; H04W 72/80; H04W 92/18
See application file for complete search history.

(56) References Cited

U.S. PATENT DOCUMENTS

| | | | |
|---|---|---|---|
| 11,109,363 B2 * | 8/2021 | Huang .................. | H04L 1/1822 |
| 2017/0257876 A1 | 9/2017 | Loehr et al. | |

(Continued)

FOREIGN PATENT DOCUMENTS

| | | |
|---|---|---|
| EP | 3817262 | 5/2021 |

OTHER PUBLICATIONS

PCT International Application No. PCT/KR2020/015603, International Search Report dated Feb. 10, 2021, 3 pages.

(Continued)

*Primary Examiner* — Rhonda L Murphy
(74) *Attorney, Agent, or Firm* — Lee Hong Degerman Kang Waimey

(57) ABSTRACT

The present disclosure relates to transmission prioritization in wireless communications. According to an embodiment of the present disclosure, a method performed by a wireless device in a wireless communication system comprises: configuring a threshold; creating a media access control (MAC) protocol data unit (MAC PDU) for sidelink comprising a MAC control element (CE); setting a priority value to the MAC CE; identifying a transmission of the MAC PDU for sidelink and an uplink transmission to be performed; determining that the transmission of the MAC PDU for sidelink and the uplink transmission are not able to be performed simultaneously; determining that the priority value of the MAC CE is lower than the threshold; prioritizing the transmission of the MAC PDU for sidelink over (Continued)

the uplink transmission; and performing the transmission of the MAC PDU for sidelink that is prioritized over the UL transmission.

12 Claims, 21 Drawing Sheets

(51) Int. Cl.
*H04W 72/10* (2009.01)
*H04W 80/02* (2009.01)
*H04W 92/18* (2009.01)

(56) References Cited

U.S. PATENT DOCUMENTS

2021/0099901 A1* 4/2021 Huang .................. H04W 72/12
2021/0168832 A1* 6/2021 Zhuo ................. H04W 72/1247

OTHER PUBLICATIONS

Samsung, "Sidelink and Uplink Prioritization," 3GPP TSG-RAN WG2 Meeting #107, R2-1911105, Aug. 2019, 3 pages.
Ericsson, "On support of SL CSI report," 3GPP TSG-RAN WG2 #107, TDoc R2-1910297, Aug. 2019, 2 pages.
OPPO (rapporteur), "Summary of [106#787] UL/SL prioritization," 3GPP TSG-RAN WG2 Meeting #107, R2-1908717, Aug. 2019, 23 pages.
Apple, "Discussion on prioritization between SL BSR and UL BSR," 3GPP TSG-RAN WG2 Meeting #107bis, R2-1913495, Oct. 2019, 4 pages.
3rd Generation Partnership Project (3GPP), "Technical Specification Group Radio Access Network; Evolved Universal Terrestrial Radio Access (E-UTRA); Medium Access Control (MAC) protocol specification (Release 15)," 3GPP TS 36.321 V15.7.0, Sep. 2019, 102 pages.
European Patent Office Application Serial No. 20884755.8, Search Report dated Sep. 14, 2022, 10 pages.
Ericsson, "Discussion on SR and BSR in sidelink", R2-1910130, 3GPP TSG-RAN WG2 #107, Aug. 2019, 4 pages.
3rd Generation Partnership Project, Technical Specification Group Radio Access Network; Evolved Universal Terrestrial Radio Access (E-UTRA); Meduim Access Control (MAC) protocol specification (Release 15), 3GPP TS 36.321 V15.3.0, Sep. 2018, 127 pages.
Huawei (Rapporteur), "Email discussion summary of [106#80][NR/V2X]—BSR and SR", R2-1909303, 3GPP TSG-RAN WG2 #107, Aug. 2019, 37 pages.
Qualcomm Incorporated, "Physical Layer Procedures for Sidelink", R1-191110, 3GPP TSG RAN WG1 Meeting #98bis, Oct. 2019, 8 pages.

* cited by examiner

SDAP
PDCP
RLC
MAC
IP Packet
n
n+1
m
H
SDAP SDU
PDCP SDU
RLC SDU
SDU Segment
MAC SDU
RBx
RBy
MAC PDU Transport block

METHOD AND APPARATUS FOR TRANSMISSION PRIORITIZATION IN WIRELESS COMMUNICATION SYSTEM

CROSS-REFERENCE TO RELATED APPLICATIONS

This application is a continuation of International Application No. PCT/KR2020/015603, filed on Nov. 9, 2020, which claims the benefit of earlier filing date and right of priority to Korean Application No. 10-2019-0142063, filed on Nov. 7, 2019, the contents of which are all hereby incorporated by reference herein in their entirety.

BACKGROUND OF THE DISCLOSURE

Field of the Disclosure

The present disclosure relates to transmission prioritization in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, a communication device may perform various types of transmissions. However, due to limited resources, a certain type of transmission may collide with other types of transmissions. In this case, one transmission may be prioritized than the other transmission.

SUMMARY OF THE DISCLOSURE

Technical Problem

An aspect of the present disclosure is to provide method and apparatus for transmission prioritization in a wireless communication system.

Another aspect of the present disclosure is to provide method and apparatus for a prioritization between an uplink transmission and a sidelink transmission in a wireless communication system.

Another aspect of the present disclosure is to provide method and apparatus for a prioritization between a sidelink MAC CE and uplink transmission in a wireless communication system.

Technical Solution

According to an embodiment of the present disclosure, a method performed by a wireless device in a wireless communication system comprises: configuring a threshold; creating a media access control (MAC) protocol data unit (MAC PDU) for sidelink comprising a MAC control element (CE); setting a priority value to the MAC CE; identifying a transmission of the MAC PDU for sidelink and an uplink transmission to be performed; determining that the transmission of the MAC PDU for sidelink and the uplink transmission are not able to be performed simultaneously; determining that the priority value of the MAC CE is lower than the threshold; prioritizing the transmission of the MAC PDU for sidelink over the uplink transmission; and performing the transmission of the MAC PDU for sidelink that is prioritized over the UL transmission.

According to an embodiment of the present disclosure, a wireless device in a wireless communication system comprises: a transceiver; a memory; and at least one processor operatively coupled to the transceiver and the memory, and configured to: configure a threshold; create a media access control (MAC) protocol data unit (MAC PDU) for sidelink comprising a MAC control element (CE); set a priority value to the MAC CE; identify a transmission of the MAC PDU for sidelink and an uplink transmission to be performed; determine that the transmission of the MAC PDU for sidelink and the uplink transmission are not able to be performed simultaneously; determine that the priority value of the MAC CE is lower than the threshold; prioritize the transmission of the MAC PDU for sidelink over the uplink transmission; and control the transceiver to perform the transmission of the MAC PDU for sidelink that is prioritized over the UL transmission.

According to an embodiment of the present disclosure, a method performed by a base station in a wireless communication system comprises: transmitting a configuration of a threshold to a wireless device, wherein the wireless device is configured to: create a media access control (MAC) protocol data unit (PDU) for sidelink comprising a MAC control element (CE); identify a transmission of the MAC PDU for sidelink and an uplink transmission to be performed; prioritize the transmission of the MAC PDU for sidelink over the uplink transmission based on that: i) the priority value of the MAC CE in the MAC PDU for sidelink is lower than the threshold; and ii) the transmission of the MAC PDU for sidelink and the uplink transmission are not able to be performed simultaneously; and transmit the MAC PDU for sidelink that is prioritized over the uplink transmission.

According to an embodiment of the present disclosure, a base station (BS) in a wireless communication system comprises: a transceiver; a memory; and at least one processor operatively coupled to the transceiver and the memory, and configured to control the transceiver to transmit a configuration of a threshold to a wireless device, wherein the wireless device is configured to: create a media access control (MAC) protocol data unit (PDU) for sidelink comprising a MAC control element (CE); identify a transmission of the MAC PDU for sidelink and an uplink transmission to be performed; prioritize the transmission of the MAC PDU for sidelink over the uplink transmission based on that: i) the priority value of the MAC CE in the MAC PDU for sidelink is lower than the threshold; and ii) the transmission of the MAC PDU for sidelink and the uplink transmission are not able to be performed simultaneously; and transmit the MAC PDU for sidelink that is prioritized over the uplink transmission.

According to an embodiment of the present disclosure, a processor for a wireless device in a wireless communication system is configured to control the wireless device to perform operations comprising: configuring a threshold; creating a media access control (MAC) protocol data unit (MAC PDU) for sidelink comprising a MAC control element (CE); setting a priority value to the MAC CE; identifying a transmission of the MAC PDU for sidelink and an uplink transmission to be performed; determining that the transmission of the MAC PDU for sidelink and the uplink transmission are not able to be performed simultaneously; determining that the priority value of the MAC CE is lower than the threshold; prioritizing the transmission of the MAC PDU for sidelink over the uplink transmission; and performing the transmission of the MAC PDU for sidelink that is prioritized over the UL transmission.

According to an embodiment of the present disclosure, a computer-readable medium having recorded thereon a program for performing each step of a method on a computer is provided. The method comprises: configuring a threshold; creating a media access control (MAC) protocol data unit (MAC PDU) for sidelink comprising a MAC control element (CE); setting a priority value to the MAC CE; identifying a transmission of the MAC PDU for sidelink and an uplink transmission to be performed; determining that the transmission of the MAC PDU for sidelink and the uplink transmission are not able to be performed simultaneously; determining that the priority value of the MAC CE is lower than the threshold; prioritizing the transmission of the MAC PDU for sidelink over the uplink transmission; and performing the transmission of the MAC PDU for sidelink that is prioritized over the UL transmission.

Advantageous Effect

The present disclosure can have various advantageous effects.

For example, a UE performing channel quality reporting by using buffer status reporting can properly allocate a resource for transmission of the channel quality reporting by considering transmissions from another UE according to the present disclosure, in particular when the UE measures a channel quality from another UE.

For example, a UE can prioritize a transmission of sidleink MAC CE over uplink transmission even when the sidelink MAC CE collides with the uplink transmission.

The present disclosure is beneficial in that the system can properly allocate a resource for channel quality reporting for a UE performing sidelink transmission or reception.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
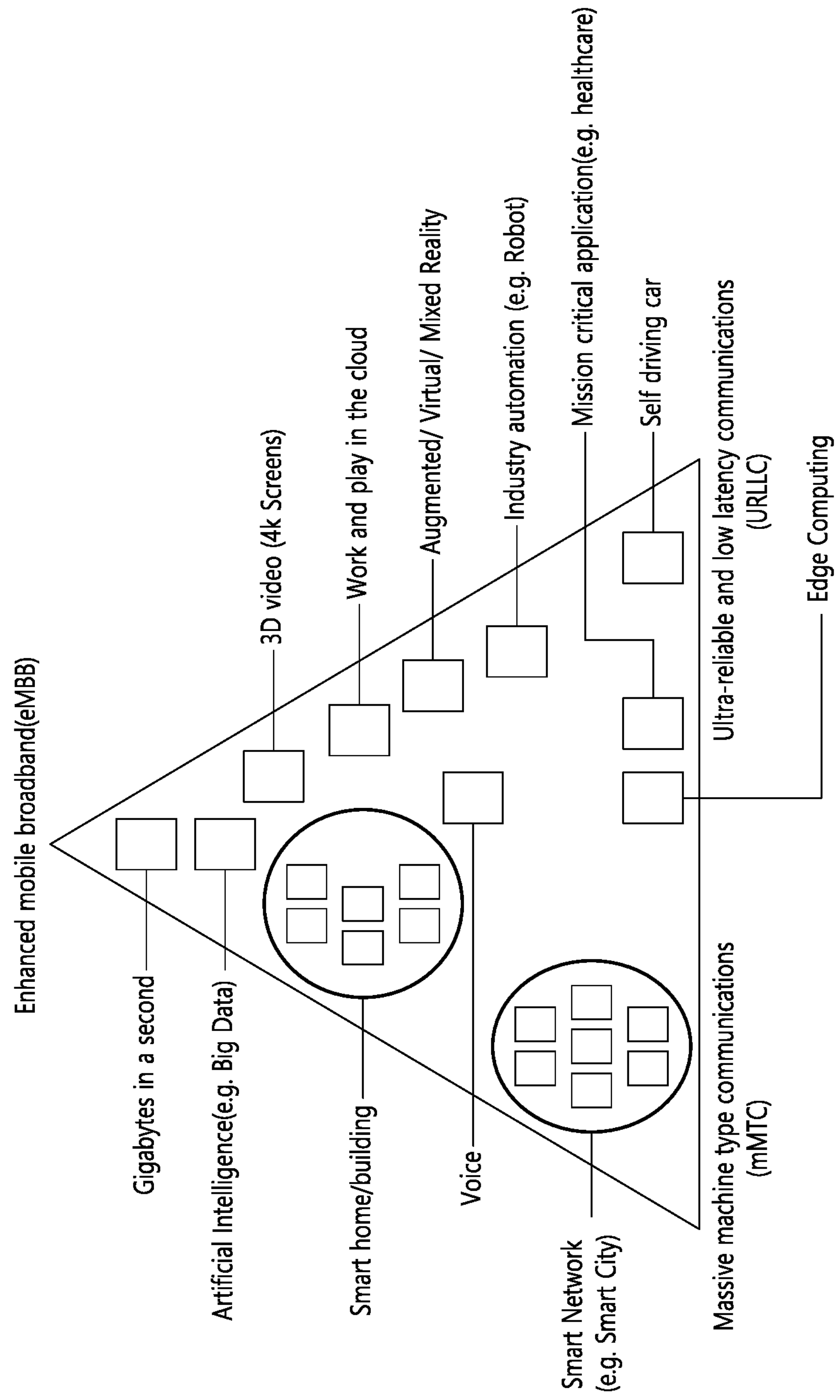
FIG. 1 illustrates an example of a communication system to which implementations of the present disclosure is applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1,3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

Logical channel prioritization (LCP) may comprise allocating resources to logical channels according to a priority of the logical channels. For example, according to LCP, resources of UL grant and/or SL grant may be allocated to logical channels in a decreasing order of a priority of the logical channels. A logical channels to which resources of SL grant and/or UL grant are allocated may be included in MAC PDU. Therefore, according to LCP, logical channels may be included in the MAC PDU in a decreasing order of a priority of the logical channels.

"Priority value of A is higher than that of B" means that priority and/or priority level of A is lower than that of B. Similarly, "Priority value of A is lower than that of B" means that priority and/or priority level of A is higher than that of B.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
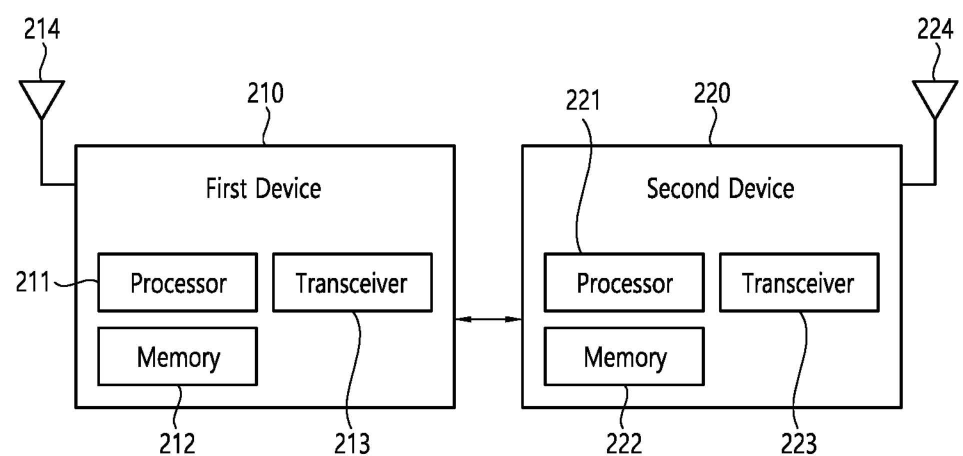
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
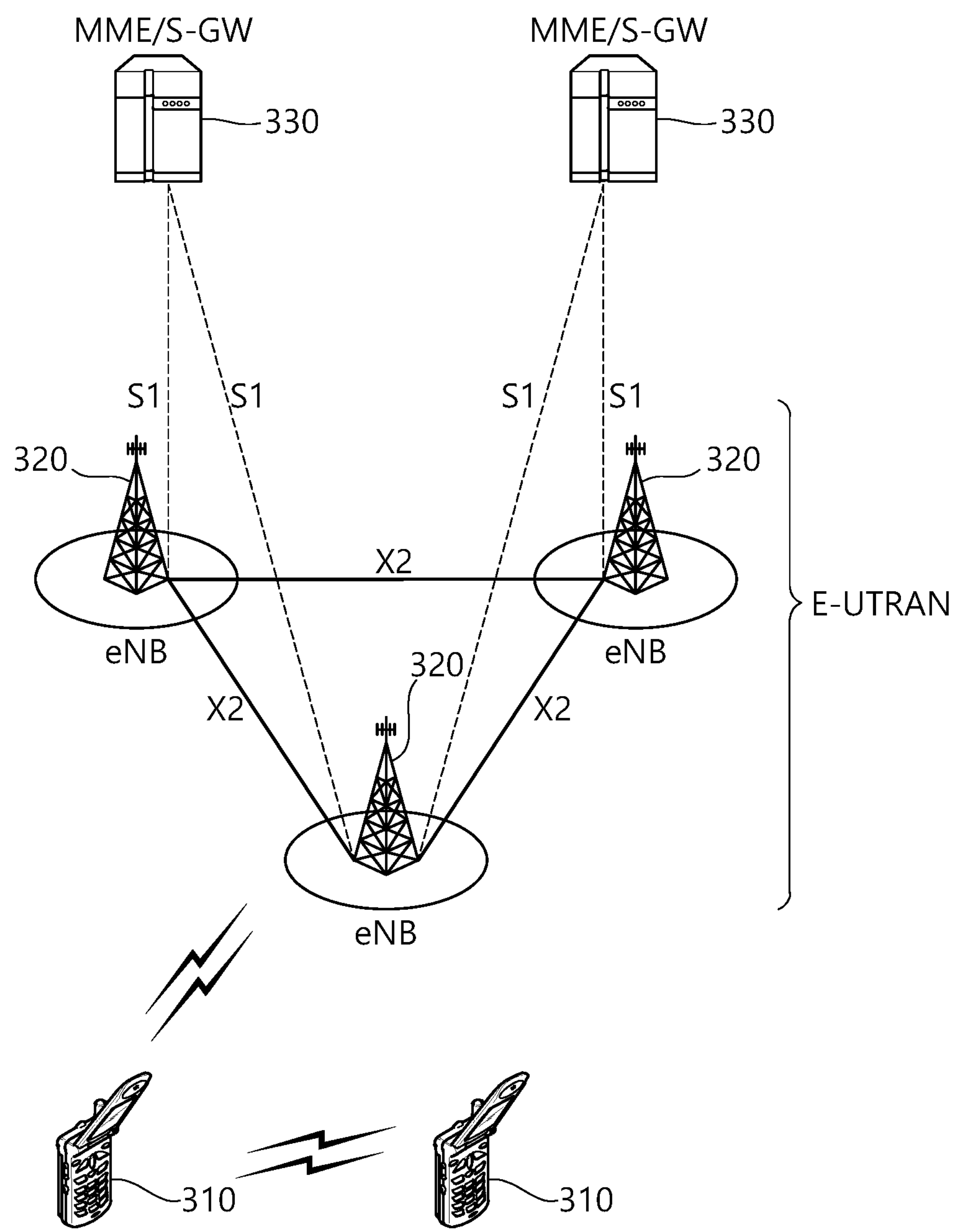
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MIME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
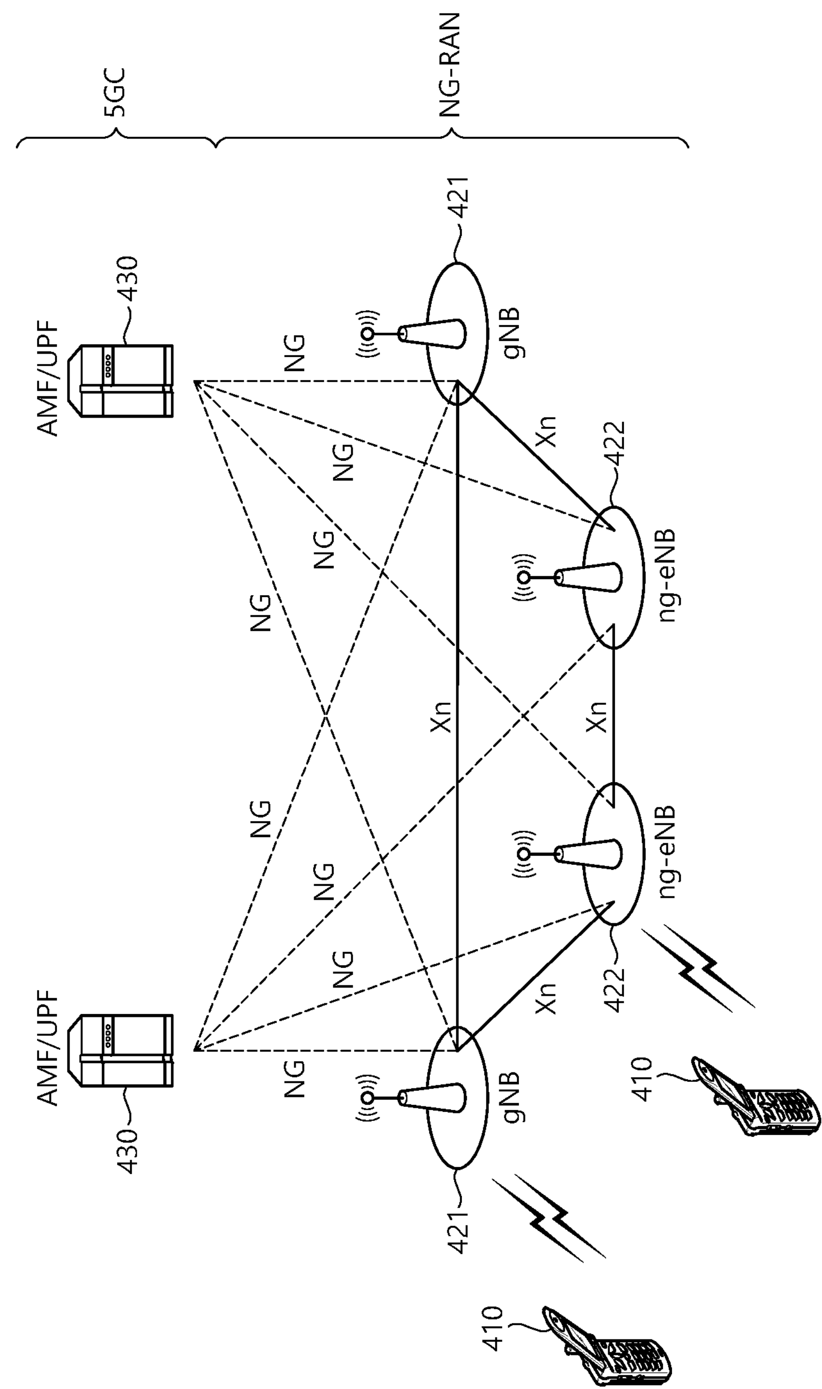
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
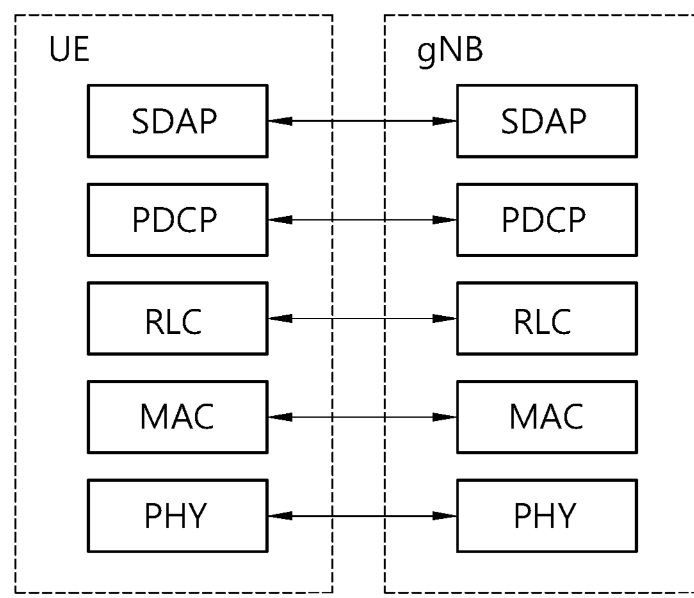
FIG. 5 shows a block diagram of a user plane protocol stack to which the technical features of the present disclosure can be applied.
Figure 6:
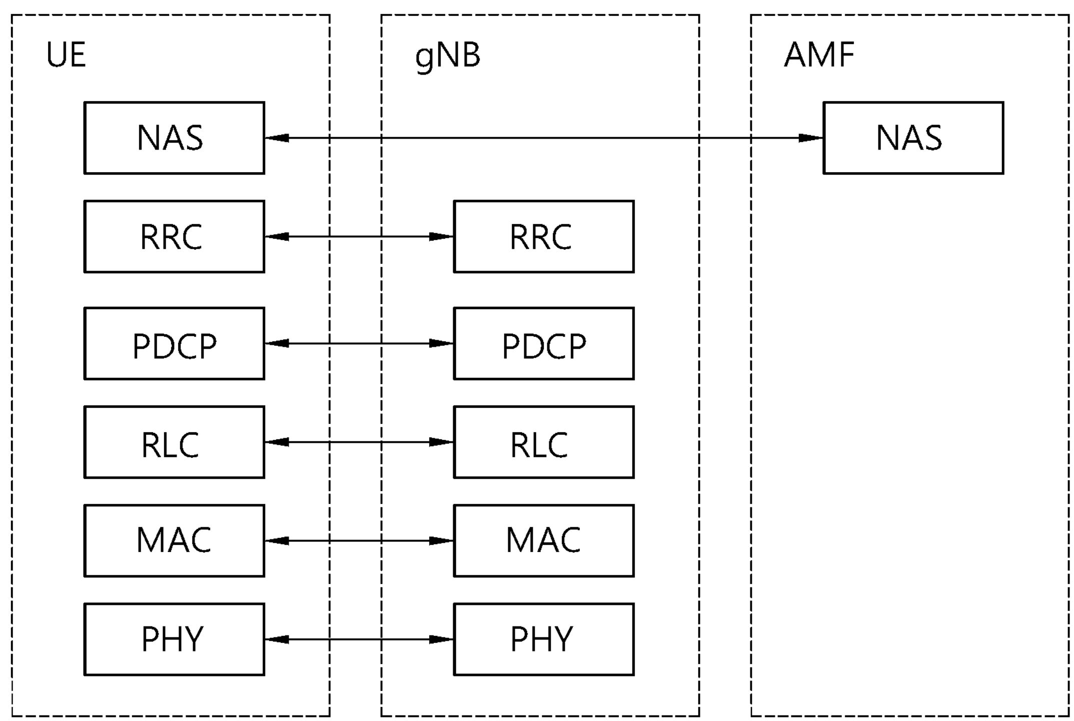
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sub layer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (S1), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
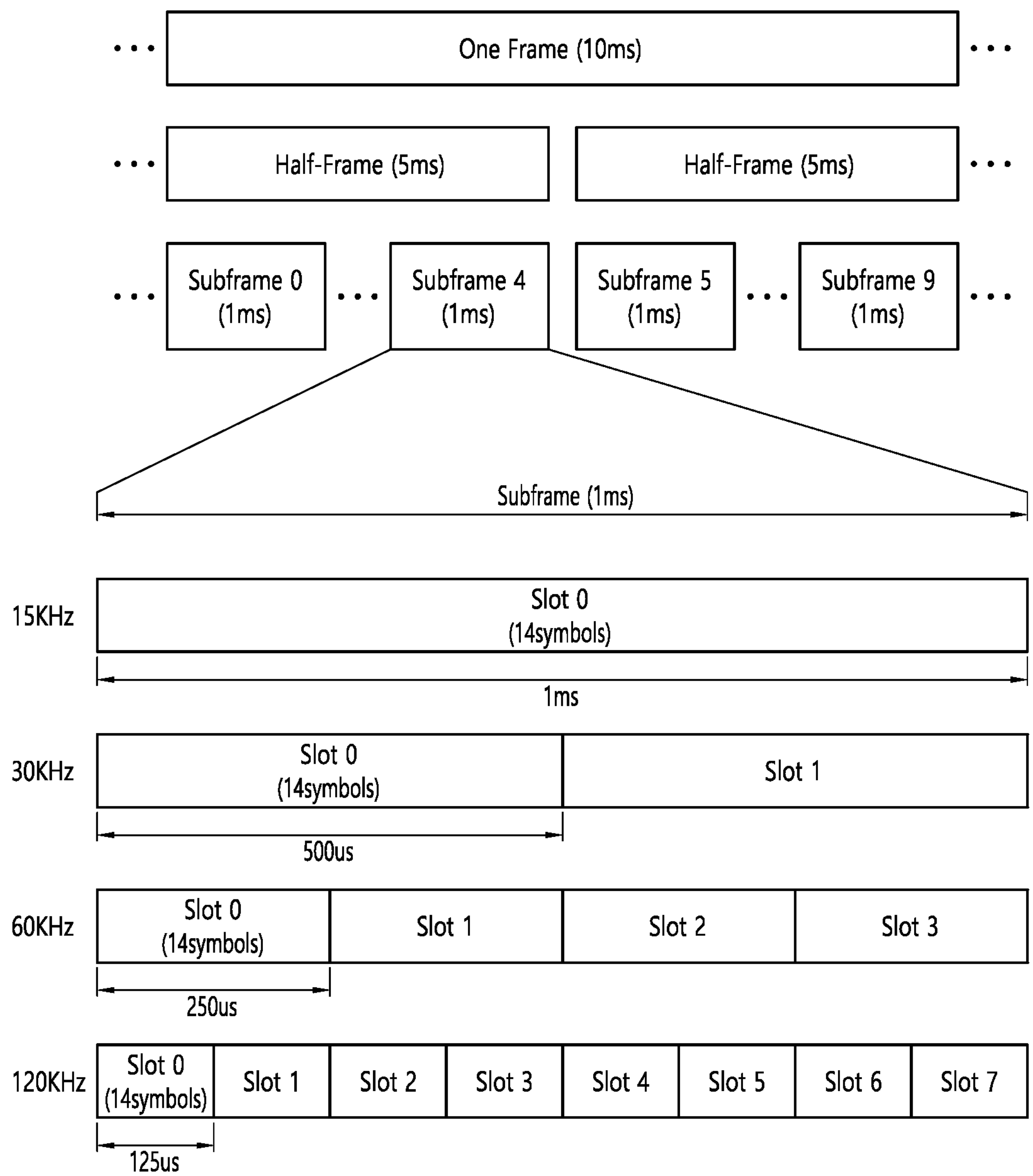
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing Δf=2u*15 kHz. The following table shows the number of OFDM symbols per slot, the number of slots per frame, and the number of slots per for the normal CP, according to the subcarrier spacing Δf=2u*15 kHz.

TABLE 3

| U | Nslotsymb | Nframe,uslot | Nsubframe,uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing Δf=2u*15 kHz.

TABLE 4

| U | Nslotsymb | Nframe,uslot | Nsubframe,uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with ‘point A’ which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE’s operating bandwidth within the cell’s operating bandwidth.

In the present disclosure, the term “cell” may refer to a geographic area to which one or more nodes provide a communication system, or refer to radio resources. A “cell” of a geographic area may be understood as coverage within which a node can provide service using a carrier and a “cell” as radio resources (e.g. time-frequency resources) is associated with bandwidth (BW) which is a frequency range configured by the carrier. The “cell” associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the “cell” of radio resources used by the node. Accordingly, the term “cell” may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term “serving cells” is used to denote the set of cells comprising of the SpCell(s) and all SCells. In DC, two MAC entities are configured in a UE: one for the MCG and one for the SCG.

Figure 8:
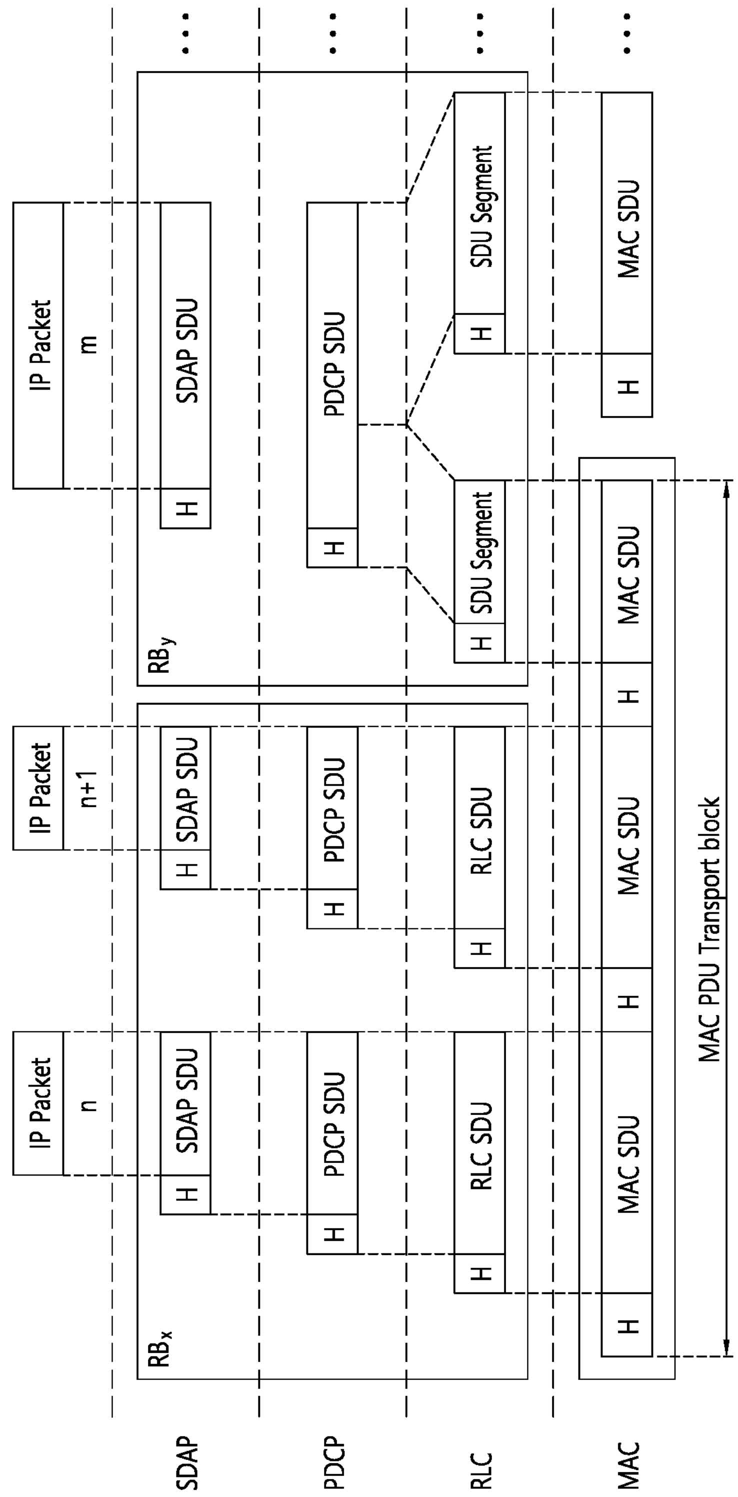
FIG. 8 illustrates a data flow example in the 3GPP NR system.

FIG. 8 illustrates a data flow example in the 3GPP NR system.

In FIG. 8, “RB” denotes a radio bearer, and “H” denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
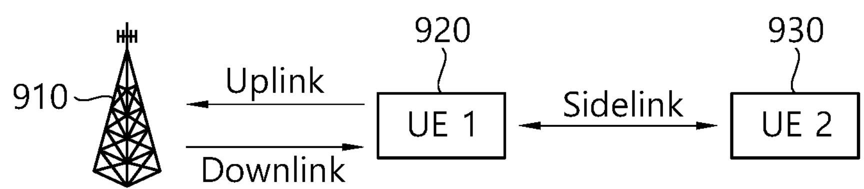
FIG. 9 shows an example of communication links to which technical features of the present disclosure can be applied.

FIG. 9 shows an example of communication links to which technical features of the present disclosure can be applied.

Referring to FIG. 9, the communication links comprise uplink, downlink, and sidelink. The uplink is a communication interface from a UE (e.g., UE 920) to a base station (e.g., base station 910, such as eNB and/or gNB). The downlink is a communication interface from a base station (e.g., base station 910) to a UE (e.g., UE 920).

The sidelink is UE to UE interface for sidelink communication, sidelink discovery and/or V2X (vehicle to everything) communication. For example, the sidelink may correspond to a PC5 interface for sidelink communication, sidelink discovery and/or V2X sidelink communication.

A UE may perform a communication via network infrastructure. For example, as shown in FIG. 9, the UE1 920 may perform an uplink transmission and/or receive a downlink transmission, via the base station 910.

Also, a UE may perform a communication directly with a peer UE without using the network infrastructure. For example, as shown in FIG. 9, the UE1 920 may perform a direct communication with the UE2 930 via sidelink, without a support of the network infrastructure such as base station 910.

According to various embodiments, upper layers configure the UE to receive or transmit sidelink communication on a specific frequency, to monitor or transmit non-public safety (PS) related sidelink discovery announcements on one or more frequencies or to monitor or transmit PS related sidelink discovery announcements on a specific frequency, but only if the UE is authorized to perform these particular proximity service (ProSe) related sidelink activities.

Sidelink communication comprises one-to-many and one-to-one sidelink communication. One-to-many sidelink communication comprises relay related and non-relay related one-to-many sidelink communication. One-to-one sidelink communication comprises relay related and non-relay related one-to-one sidelink communication. In relay related one-to-one sidelink communication the communicating parties comprise one sidelink relay UE and one sidelink remote UE.

Sidelink discovery comprises public safety related (PS related) and non-PS related sidelink discovery. PS related sidelink discovery comprises relay related and non-relay related PS related sidelink discovery. Upper layers indicate to RRC whether a particular sidelink announcement is PS related or non-PS related.

According to various embodiments, upper layers indicate to radio resource control (RRC) whether a particular sidelink procedure is V2X related or not.

According to various embodiments, the UE shall perform V2X sidelink communication operation if at least one of the following conditions 1)-3) is met:

Condition 1) if the UE's serving cell is suitable (RRC_IDLE or RRC_CONNECTED); and if either the selected cell on the frequency used for V2X sidelink communication operation belongs to the registered or equivalent public land mobile network (PLMN) as specified in 3GPP TS 24.334 or the UE is out of coverage on the frequency used for V2X sidelink communication operation as defined in 3GPP TS36.304;

Condition 2) if the UE's serving cell (for RRC_IDLE or RRC_CONNECTED) fulfils the conditions to support V2X sidelink communication in limited service state as specified in 3GPP TS 23.285; and if either the serving cell is on the frequency used for V2X sidelink communication operation or the UE is out of coverage on the frequency used for V2X sidelink communication operation as defined in 3GPP TS 36.304; or Condition 3) if the UE has no serving cell (RRC_IDLE).

Figure 10:
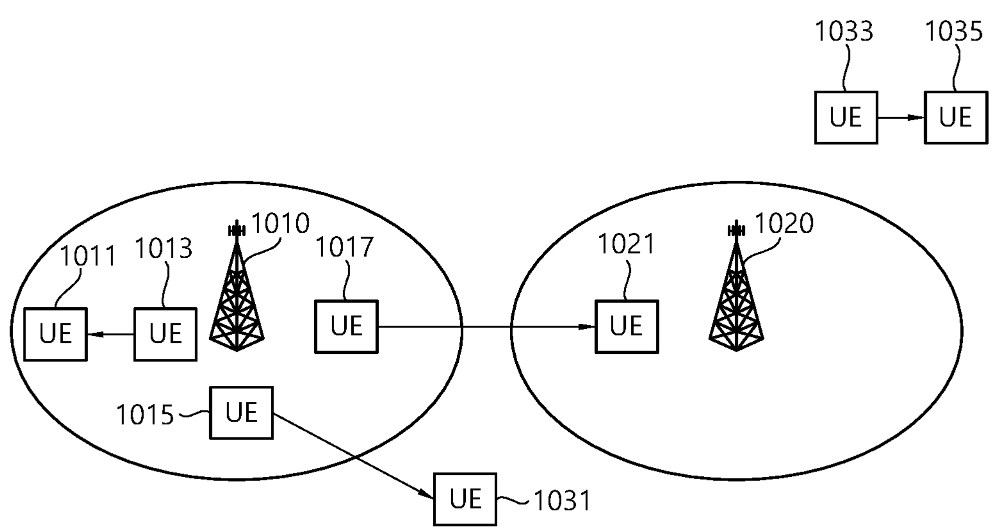
FIG. 10 shows an example of sidelink connectivity types to which technical features of the present disclosure can be applied.

FIG. 10 shows an example of sidelink connectivity types to which technical features of the present disclosure can be applied.

Referring to FIG. 10, a sidelink connectivity between UE 1011 and UE 1013 may be "in-coverage", where the two UEs UE 1011 and UE 1013 are under a coverage of a network (e.g., base station 1010). Also, the sidelink connectivity between the UE 1011 and the UE 1013 may be in-coverage of intra-cell type, as the UE 1011 receiving a sidelink transmission is within a same cell as the UE 1013 transmitting the sidelink transmission.

A sidelink connectivity between UE 1017 and UE 1021 may be also in-coverage, as the two UEs 1017 and 1021 are under a coverage of a network. However, unlike the case of the UE 1011 and the UE 1013, the sidelink connectivity between the UE 1017 and the UE 1021 may be in-coverage of inter-cell type, as the UE 1021 receiving a sidelink transmission is within a cell coverage of a base station 1020 while the UE 1017 transmitting the sidelink transmission is within a cell coverage of a base station 1010.

A sidelink connectivity between UE 1015 and UE 1031 may be "partial-coverage", where one of the two UEs (e.g., UE 1015) is under a coverage of a network while the other UE (e.g., UE 1031) is outside the coverage of the network.

A sidelink connectivity between UE 1033 and UE 1035 may be "out-of-coverage", where the two UEs UE 1033 and UE 1035 are outside a coverage of a network.

Hereinafter, sidelink resource allocation is described.

There may be a plurality of sidelink resource allocation modes, comprising sidelink resource allocation mode 1 and sidelink resource allocation mode 2.

In sidelink resource allocation mode 1, BS may schedule SL resource(s) to be used by UE for SL transmission(s). In sidelink resource allocation mode 2, UE may determine (i.e., BS does not schedule), SL transmission resource(s) within i) SL resources configured by BS/network, or ii) pre-configured SL resources. The sidelink resource allocation mode 1 may be simply referred to as sidelink mode 1.

In SL resource allocation mode 2, UE may or may be: a) autonomously select SL resource for transmission; b) assist SL resource selection for other UE(s), a functionality which can be part of a), c), d); c) configured with configured grant for SL transmission; and/or d) schedule SL transmissions of other UEs. The SL resource allocation mode 2 may support a reservation of SL resources at least for blind retransmission. The sidelink resource allocation mode 2 may be simply referred to as sidelink mode 2.

For sidelink resource allocation mode 2, sensing- and resource (re-)selection-related procedures are supported. The sensing procedure may comprise decoding SCI(s) from other UEs and/or SL measurements. Decoding SCI(s) in the sensing procedure may provide at least information on SL resources indicated by the UE transmitting the SCI. The sensing procedure may use a L1 SL RSRP measurement based on SL DMRS when the corresponding SCI is decoded. The resource (re-)selection procedure may use the results of the sensing procedure to determine resource(s) for SL transmission.

If a TX UE is in RRC_CONNECTED and configured for BS scheduled sidelink resource allocation (i.e., sidelink resource allocation mode 1), the TX UE may transmit Sidelink UE Information including Traffic Pattern of Service, TX carriers and/or RX carriers mapped to Service, QoS information related to Service (e.g., 5QI, PPPP, PPPR, QCI value), and/or Destination related to Service After receiving Sidelink UE Information, the BS may construct Sidelink Configuration at least including one or more resource pools for Service and Sidelink BSR configuration. The BS may signal the Sidelink Configuration to the TX UE and then the TX UE may configure lower layers with Sidelink Configuration.

If a message becomes available in L2 buffer for sidelink transmission, the TX UE may triggers Scheduling Request (SR), so that the TX UE may transmit the SR on PUCCH resource. If PUCCH resource is not configured, the TX UE may perform random access procedure as the Scheduling Request. If an uplink grant is given at a result of the SR, the TX UE may transmit Sidelink Buffer Status Report (SL BSR) to BS. The Sidelink Buffer Status Report may indicate at least a Destination index, a LCG, and/or a buffer size corresponding to the destination.

After receiving the SL BSR, the BS may transmit a sidelink grant to the TX UE by sending Downlink Control Information (DCI) in PDCCH. The DCI may include an allocated sidelink resource. If the TX UE receives the DCI, the TX UE may use the sidelink grant for transmission to the RX UE.

Alternatively, if the TX UE is configured for UE autonomous scheduling of sidelink resource allocation regardless of RRC state (e.g., sidleink resource allocation mode 2), the TX UE may autonomously select or reselect sidelink resources to create a sidelink grant used for transmission to the RX UE.

Figure 11:
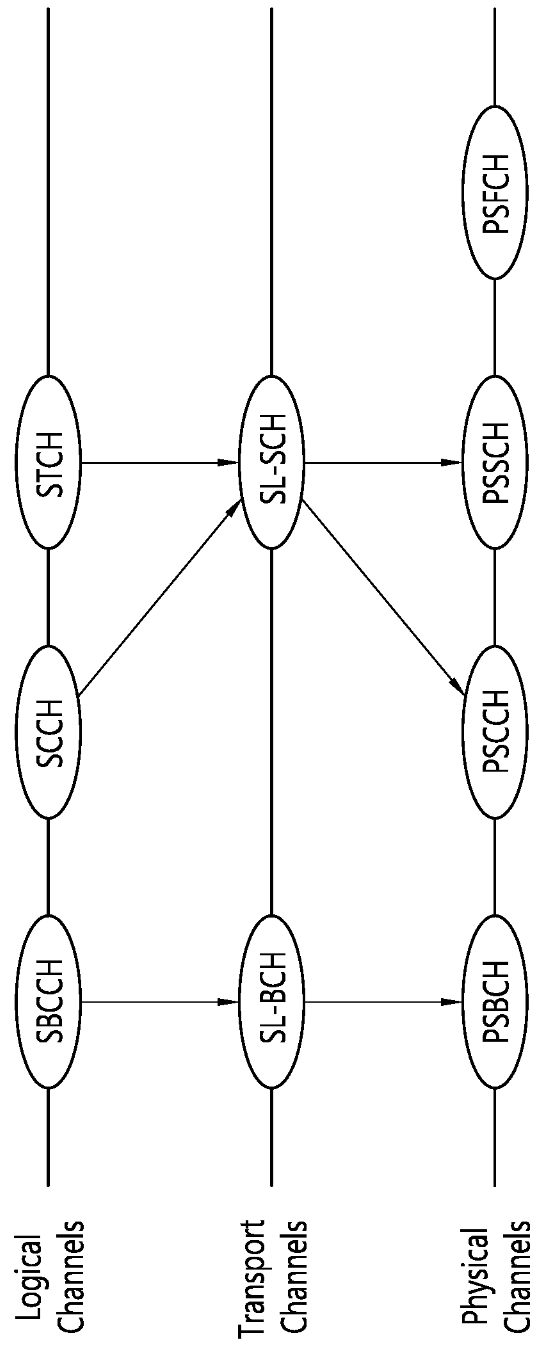
FIG. 11 shows an example of sidelink channel mapping to which technical features of the present disclosure can be applied.

FIG. 11 shows an example of sidelink channel mapping to which technical features of the present disclosure can be applied.

Referring to FIG. 11, sidelink logical channels may comprise sidelink traffic channel (STCH), sidelink control channel (SCCH) and sidelink broadcast control channel (SBCCH). Sidelink transport channels may comprise sidelink shared channel (SL-SCH) and sidelink broadcast channel (SL-BCH). Sidelink physical channels may comprise a physical sidelink shared channel (PSSCH), a physical sidelink control channel (PSCCH), a physical sidelink feedback channel (PSFCH) and physical sidelink broadcast channel (PSBCH).

The SCCH is a sidelink channel for transmitting control information (i.e., PC5-RRC and PC5-S messages) from one UE to one or more other UEs. The SCCH can be mapped to SL-SCH which, in turn, mapped to the PSCCH.

The STCH is a sidelink channel for transmitting user information from one UE to one or more other UEs. The STCH can be mapped to SL-SCH which, in turn, is mapped to the PSSCH.

The SBCCH is a sidelink channel for broadcasting sidelink system information from one UE to other UE(s). The SBCCH can be mapped to SL-BCH which, in turn, mapped to the PSBCH. These channels are also used for sidelink synchronization, and comprise sidelink related system information. For example, the sidelink related system information may be referred to as sidelink master information block (SL-MIB).

The PSCCH carries sidelink control information (SCI). The SCI contains sidelink scheduling information such as resource block assignment, modulation and coding scheme, and/or group destination ID.

The PSSCH carries transport blocks (TBs) of data, and control information for HARQ procedures and CSI/or CSI feedback triggers.

The PSFCH carries HARQ feedback over the sidelink from a UE which is an intended recipient of a PSSCH transmission to the UE which performed the transmission.

Figure 12:
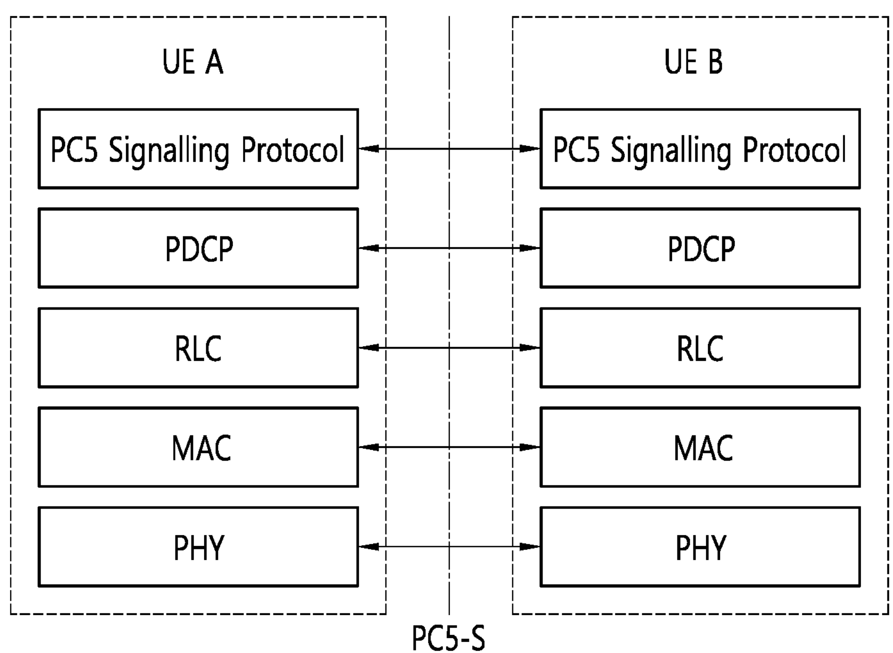
FIG. 12 shows an example of a control plane protocol stack for SCCH for PC5-signalling (PC5-S) to which technical features of the present disclosure can be applied.

FIG. 12 shows an example of a control plane protocol stack for SCCH for PC5-signalling (PC5-S) to which technical features of the present disclosure can be applied.

In the present disclosure, PC5 may refer to a reference point in which a wireless device may directly communicate with another wireless device over a direct channel. Sidelink is a terminology to refer to the direct communication over PC5.

Referring to FIG. 12, for support of PC5-S protocol, PC5-S is located on top of PDCP, RLC and MAC sublayers, and the physical layer in the control plane protocol stack for SCCH for PC5-S.

The PC-5 S protocol may be used for control plane signalling over the PC5 reference point for the secure layer-2 link. The functionality of PDCP/RLC/MAC/PHY may be the same as illustrated in FIG. 5-6.

Figure 13:
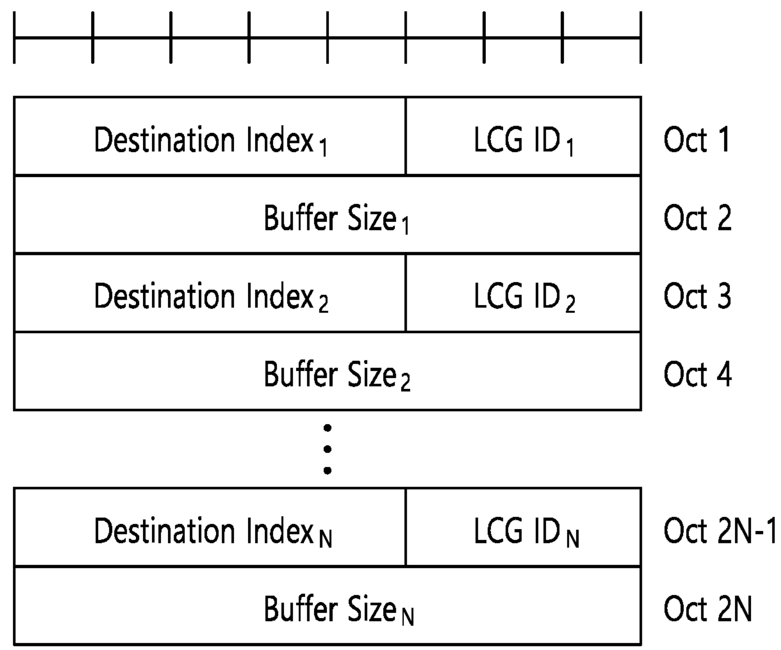
FIG. 13 shows an example of a SL-BSR and Truncated SL-BSR MAC CE.

FIG. 13 shows an example of a SL-BSR and Truncated SL-BSR MAC CE.

Buffer status report (BSR) is a kind of MAC CE from UE to a network carrying information on how much data is in UE buffer to be transmitted. The BSR may comprise BSR for uplink and/or BSR for sidelink. Throughout the disclosure, the BSR for uplink may be simply referred to as BSR, whereas the BSR for sidelink may be referred to as SL-BSR. The BSR may indicate an amount of UL data in UE buffer to be transmitted via uplink. The SL-BSR may indicate an amount of SL data in UE buffer to be transmitted via sidelink. When a UE transmitted a BSR to a network, the network may allocate a UL grant for UL transmission to the UE. When a UE transmitted a SL-BSR to a network, the network may allocate a SL grant for SL transmission to the UE.

SL-BSR MAC CE may comprise at least one of a SL-BSR format (variable size), or a Truncated SL-BSR format (variable size).

Referring to FIG. 13, SL-BSR and Truncated SL-BSR MAC control elements may comprise a Destination Index field, a LCG ID field and a corresponding Buffer Size field per reported target group.

The SL-BSR formats may be identified by MAC subheaders with LCIDs.

The fields in the SL-BSR MAC CE are defined as follows:

Destination Index: The Destination Index field may identify the destination. The length of this field may be 5 bits. The value may be set to one index among index(es) associated to same destination reported in [v2x-DestinationInfoList]. If multiple such lists are reported, the value may be indexed sequentially across all the lists in the same order;

LCG ID: The Logical Channel Group ID field may identify the group of logical channel(s) whose SL buffer status is being reported. The length of the field may be 3 bits;

$LCG_i$: For the SL-BSR format, this field may indicate the presence of the Buffer Size field for the logical channel group i. The $LCG_i$ field set to 1 may indicate that the Buffer Size field for the logical channel group i is reported. The $LCG_i$ field set to 0 may indicate that the Buffer Size field for the logical channel group i is not reported. For the Truncated SL-BSR format, this field may indicate whether logical channel group i has data available. The $LCG_i$ field set to 1 may indicate that logical channel group i has data available. The $LCG_i$ field set to 0 may indicate that logical channel group i does not have data available;

Buffer Size: The Buffer Size field may identify the total amount of data available according to the SL data volume calculation procedure across all logical channels of a logical channel group of a destination after the MAC PDU has been built (i.e. after the logical channel prioritization procedure, which may result the value of the Buffer Size field to zero). The amount of data may be indicated in number of bytes. The size of the RLC and MAC headers may not be considered in the buffer size computation. The length of this field may be 8 bits.

For the SL-BSR format and the Truncated SL-BSR format, the Buffer Size fields may be included in ascending order based on the $LCG_i$. For the Truncated SL-BSR format, the number of Buffer Size fields included may be maximised, while not exceeding the number of padding bits. The number of the Buffer Size fields in the SL-BSR and Truncated SL-BSR format can be zero.

In a wireless communication system, RACH can be configured either 2-step RACH or 4-step RACH. For 4-step RACH, UE may transmit a RACH preamble, receive Random Access Response MAC CE, transmit a message 3 (i.e., device identification message) on PUSCH, and receive Contention Resolution MAC CE. For 2-step RACH, UE may transmit a message A comprising a RACH preamble and a device identification message on PUSCH, and receive a message B comprising Random Access Response and Contention Resolution.

In a wireless communication system, a UE may measure a quality of sidelink transmission such as sidelink-reference signal received power (SL-RSRP), SL-reference signal received quality (SL-RSRQ), channel stat information (CSI), channel quality indication (CQI), and/or rank indication (RI) based on sidelink transmissions from another UE. Based on the measurement, UE may report the measured result to another UE. In this case, UE may need a SL grant to transmit the measured result. However, UE may not have a valid SL grant for reporting the measured result to the other UE.

Figure 14:
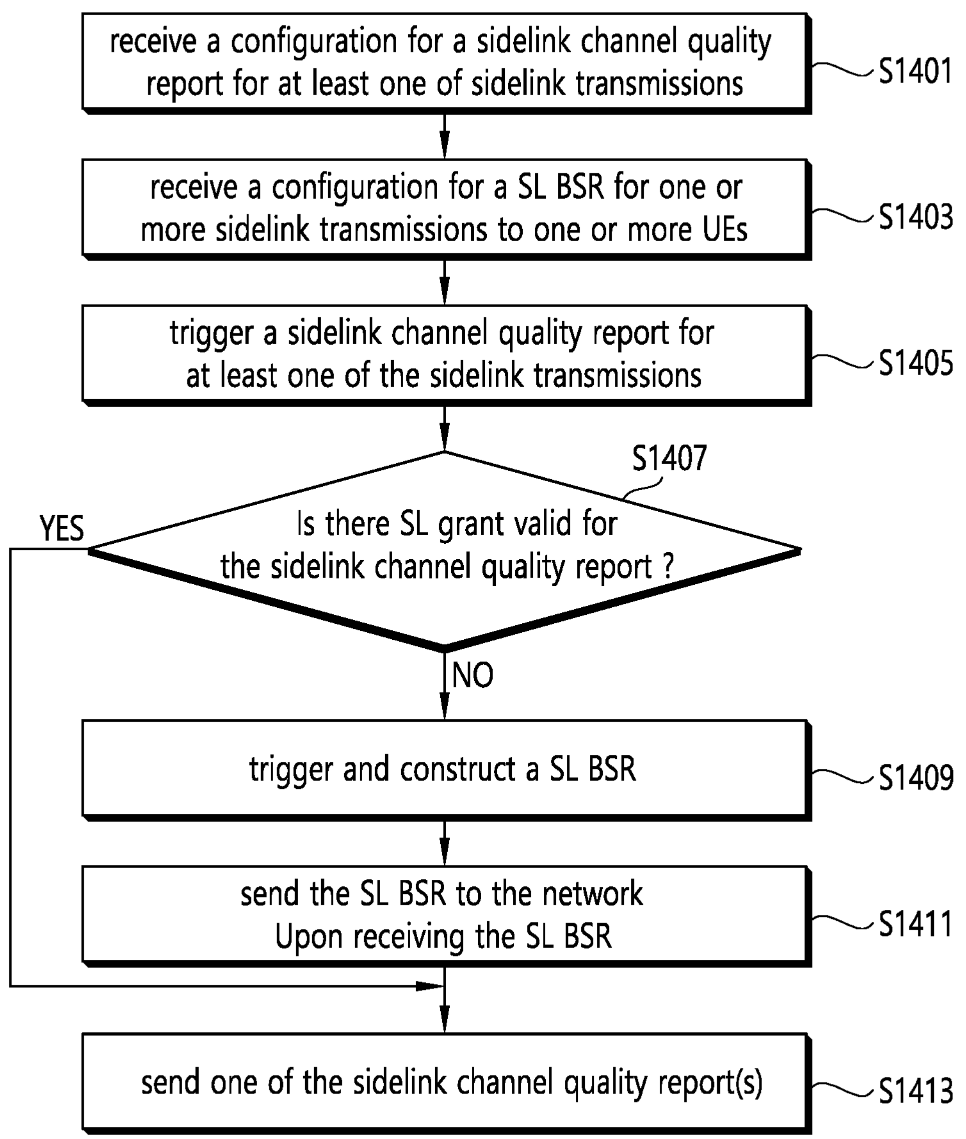
FIG. 14 shows an example of a method for a sidelink channel quality report according to an embodiment of the present disclosure.

FIG. 14 shows an example of a method for a sidelink channel quality report according to an embodiment of the present disclosure. Steps illustrated in FIG. 14 may be performed by a wireless device and/or a UE.

Referring to FIG. 14, in step S1401, the UE may receive a configuration for a sidelink channel quality report for at least one of sidelink transmissions. Then, the UE may indicate the configuration for the sidelink channel quality report to a network. The configuration for sidelink channel quality report may be transmitted to the UE by another UE.

In step S1403, the UE may receive a configuration for a sidelink (SL) buffer status report (BSR) for one or more sidelink transmissions to one or more UEs. The sidelink transmissions may correspond to one or more destinations. The sidelink transmissions may correspond to one or more pairs of source and destination. The sidelink transmissions may correspond to one or more PC5 RRC connections or one or more PC5-S unicast links. The SL BSR configuration (i.e., the configuration for SL-BSR) may indicate that the sidelink channel quality report is enabled.

In step S1405, the UE may trigger a sidelink channel quality report for at least one of the sidelink transmissions.

In step S1407, the UE may determine whether there is SL grant valid for the sidelink channel quality report. If there is no SL grant valid for the sidelink channel quality report, the UE may perform step S1409. On the other hand, if there is SL grant valid for the sidelink channel quality report, the UE may perform step 1413.

In step S1409, the UE may trigger and construct a SL BSR in which a particular value of a particular field is used to indicate the sidelink channel quality report for one of the sidelink transmissions. Different sidelink channel quality reports for different sidelink transmissions may be indicated by the particular value of different particular fields, each of which may correspond to a different sidelink channel quality report.

In step S1411, the UE may send the SL BSR to the network. Upon receiving the SL BSR, the network may allocate a SL grant including at least the size of one or more sidelink channel quality reports indicated by the SL BSR.

In step S1413, upon receiving a SL grant valid for the sidelink channel quality report(s), the UE may send one of the sidelink channel quality report(s). The sidelink channel quality report may be transmitted to another UE in sidelink.

Figure 15:
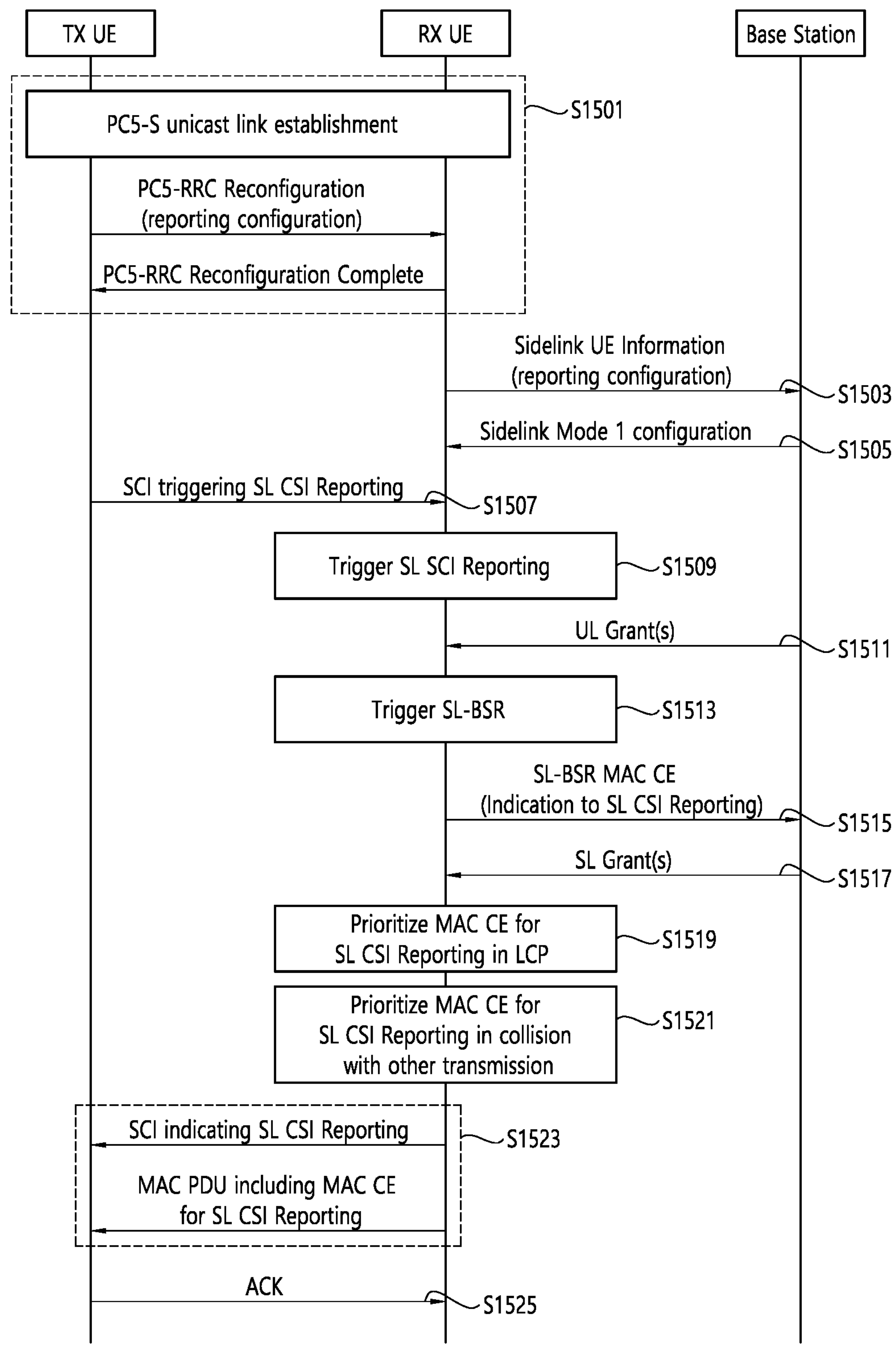
FIG. 15 shows an example of a signal flow for SL-CSI reporting according to an embodiment of the present disclosure.

FIG. 15 shows an example of a signal flow for SL-CSI reporting according to an embodiment of the present disclosure. FIG. 15 is only exemplary, and the present disclosure can also be applied to a quality reporting for uplink data transmission as well.

Referring to FIG. 15, in step S1501, RX UE may establish a PC5-S unicast link and the associated PC5-RRC connection with TX UE. TX UE may transmit a PC5-RRC reconfiguration in which CSI reporting is configured for the PC5-RRC connection. Upon receiving the PC5-RRC reconfiguration, RX UE may configure SL CSI reporting and perform measurements on sidelink CSI-RS transmissions provided by TX UE.

In step S1503, RX UE may send Sidelink UE information indicating the destination ID of the TX UE to the network. RX UE may indicate to the network that SL CSI reporting is configured for the destination ID via, for example, the Sidelink UE Information. The destination ID may be associated to a destination index according to the contents of the Sidelink UE Information. RX UE may be configured with/receive a configuration for sidelink BSR at least for the destination ID. The configuration may also indicate that the sidelink CSI reporting is enabled.

In step S1505, the RX UE may receive a sidelink mode 1 configuration from a network. That is, the RX UE may receive, from the network, a configuration for the RX UE to operate in a sidelink resource allocation mode 1.

In step S1507, the RX UE may receive SCI triggering SL CSI reporting from the TX UE.

In step S1509, upon receiving the SCI indicating sidelink CSI reporting from the TX UE, the RX UE may trigger a sidelink CSI reporting for the destination.

In step S1511, the RX UE may receive UL grants from the network.

In step S1513, if there is no sidelink grant valid for the sidelink CSI reporting, and if sidelink mode 1 is configured for the sidelink CSI reporting, the RX UE may trigger a SL BSR. Then, the RX UE may construct a SL BSR in which a particular value of a particular field is used to indicate the sidelink CSI reporting for the destination ID. For instance, a particular value of at least one of the Destination Index, the LCG ID or the Buffer Size may indicate the SL CSI reporting.

If a particular value of the Destination Index field is used to indicate the SL CSI reporting, the value of the LCG ID field or the Buffer Size field may indicate the number of the destinations and/or the PC5-RRC connections in which SL CSI reporting has been triggered.

If a particular value of the LCG ID field is used to indicate the triggered SL CSI reporting, the value of the Destination Index field may indicate the Destination Index according to the Sidelink UE information. The value of the Buffer Size field may indicate the size of the SL CSI Reporting MAC CE. Alternatively, in this case, the Buffer Size field corresponding to the SL CSI Reporting MAC CE may not be included in the SL BSR MAC CE.

If a particular value of the Buffer Size field is used to indicate the triggered SL CSI reporting, the value of the Destination Index field may indicate the Destination Index according to the Sidelink UE information. The value of the LCG ID field may indicate a sidelink channel quality (e.g., SL CSI, SL-RSRP or SL-RSRQ) of the PC5-RRC connection for the destination. Alternatively, in this case, the LCG ID field may not be included in the SL BSR MAC CE.

Alternatively, a certain field in the SL BSR MAC CE may indicate an extension of the SL BSR MAC CE and then may be followed by a list of the Destination Index fields, each of which a SL CSI Reporting has been triggered.

The RX UE may set the priority of the SL BSR indicating the SL CSI reporting as the highest priority of the logical channels belonging to the destination of the PC5-RRC connection. If the value of the priority of the SL BSR is lower than a threshold indicated by the network, the RX UE may prioritize the SL BSR for a logical channel prioritization and/or for a prioritization of SL BSR transmission over other transmissions in collision.

In step S1515, after logical channel prioritization and, if there is collision, prioritization of SL BSR transmission over other transmissions in collision, the RX UE may send the constructed SL BSR MAC CE to the network, via the UL grant.

In step S1517, upon receiving the SL BSR, the network may allocate, to the RX UE, a SL grant including at least the size of one or more SL CSI reports indicated by the SL BSR.

Alternatively, if there is no sidelink grant valid for the sidelink CSI reporting, and if sidelink mode 2 is configured for the sidelink CSI reporting, the RX UE may trigger TX carrier or resource reselection and autonomously reserve i) a SL grant for a transmission of a single MAC PDU or ii) multiple SL grants for transmissions of multiple MAC PDUs.

Upon receiving or allocating a SL grant valid for the sidelink CSI reporting(s), the UE may construct a SL CSI reporting MAC CE for the SL CSI reporting that has been triggered and indicated by the SL BSR MAC CE. Then, after performing steps S1519 and S1521 or which may be skipped, the RX UE may submit a MAC PDU including the SL CSI Reporting MAC CE to the physical layer.

In step S1519, the RX UE may prioritize the SL-CSI reporting MAC CE in logical channel prioritization (LCP).

In step S1521, the RX UE may prioritize the SL-CSI reporting MAC CE in collision with other transmissions.

If more than one SL CSI reporting has been triggered for the destination or the PC5-RRC connection, the RX UE may cancel all triggered SL CSI reportings in case that one of the following conditions a)-e) is met:

Condition a) when the SL BSR MAC CE indicating the SL CSI Reporting MAC CE is triggered, submitted to the physical layer or transmitted to the network;

Condition b) when a MAC PDU including the SL CSI Reporting MAC CE is submitted to the physical layer or transmitted to TX UE for the destination or the PC5-RRC connection;

Condition c) when radio link failure is detected for the destination or the PC5-RRC connection;

Condition d) when a new SCI triggering a SL CSI Reporting is received from TX UE for the destination or the PC5-RRC connection; and Condition e) when a new SCI releasing or stopping a SL CSI Reporting is received from TX UE for the destination or the PC5-RRC connection.

In step S1523, the RX UE may transmit SCI indicating a transmission of the SL CSI Reporting MAC CE and a MAC PDU including the SL CSI Reporting MAC CE in sidelink.

In step S1525, the RX UE may receive, from the TX UE, a HARQ feedback which may indicate an acknowledgement for the MAC PDU including the SL CSI reporting MAC CE transmitted from the RX UE.

Upon receiving the HARQ feedback, the RX UE may re-transmit the MAC PDU in sidelink.

The RX UE may start or restart a timer, in case that one of the following conditions is met:

- when the SL BSR MAC CE indicating the SL CSI Reporting MAC CE is triggered, submitted to the physical layer or transmitted to the network;
- when a MAC PDU including the SL CSI Reporting MAC CE is submitted to the physical layer or transmitted to TX UE for the destination or the PC5-RRC connection;
- when radio link failure is detected for the destination or the PC5-RRC connection;
- when a new SCI triggering a SL CSI Reporting is received from TX UE for the destination or the PC5-RRC connection;
- when a new SL CSI reporting is triggered; and
- when a new SCI releasing or stopping a SL CSI Reporting is received from TX UE for the destination or the PC5-RRC connection.

Upon expiry of the timer, the RX UE may re-trigger or re-transmit the SL CSI reporting. Then, the RX UE may re-send the SL CSI Reporting MAC CE to TX UE.

In the disclosure, the UL transmissions and SL transmissions can be performed for different RATs or the same RAT.

The present disclosure can be also applied to channel quality reporting of different uplink transmissions to different base stations (e.g., configured for dual connectivity or carrier aggregation in uplink). In this case, the TX UE in FIG. 15 can be replaced by the same or a different base station.

In the disclosure, each HARQ process may be associated with a HARQ buffer.

New transmissions may be performed on the resource and with the MCS indicated on either PDCCH, Random Access Response, or RRC. Retransmissions may be performed on the resource and, if provided, with the MCS indicated on PDCCH, or on the same resource and with the same MCS as was used for last made transmission attempt within a bundle.

If the HARQ entity requests a new transmission for a TB, the HARQ process shall:

1> store the MAC PDU in the associated HARQ buffer;

1> store the uplink grant received from the HARQ entity;

1> generate a transmission as described below.

If the HARQ entity requests a retransmission for a TB, the HARQ process shall:

1> store the uplink grant received from the HARQ entity;

1> generate a transmission as described below.

To generate a transmission for a TB, the HARQ process shall:

1> if the MAC PDU was obtained from the Msg3 buffer; or

1> if there is no measurement gap at the time of the transmission and, in case of retransmission, the retransmission does not collide with a transmission for a MAC PDU obtained from the Msg3 buffer:

2> if there are neither sidelink transmission of the MAC entity nor transmission of V2X sidelink communication of the other MAC entity (i.e. E-UTRA MAC entity) at the time of the transmission; or 2> if there is a configured grant for transmission of V2X sidelink communication on SL-SCH of the other MAC entity (i.e. E-UTRAN MAC entity) at the time of the transmission, and either none of the transmissions of V2X sidelink communication is prioritized or both the MAC entity and the other MAC entity is able to perform this UL transmission and the transmissions of V2X sidelink communication which are prioritized simultaneously; or 2> if there is a sidelink grant for sidelink transmission at the time of the transmission, and the sidelink transmission is not prioritized or the value of the highest priority of the logical channel(s) in the MAC PDU is lower than [thresUL-TxPrioritization] if [thresUL-TxPrioritization] is configured; or 2> if there is a sidelink grant for sidelink transmission at the time of the transmission, and the MAC entity is able to perform this UL transmission and the sidelink transmission prioritized simultaneously:

3> instruct the physical layer to generate a transmission according to the stored uplink grant.

In the disclosure, there may be two types of transmission without dynamic grant:

configured grant Type 1 where an sidelink grant is provided by RRC, and stored as configured sidelink grant;

configured grant Type 2 where an sidelink grant is provided by PDCCH, and stored or cleared as configured sidelink grant based on L1 signalling indicating configured sidelink grant activation or deactivation.

Type 1 and Type 2 may be configured with a single BWP. Multiple configurations can be active simultaneously on the BWP. For Type 2, activation and deactivation may be independent.

RRC may be configure the following parameters when the configured grant Type 1 is configured:

slcs-RNTI: SLCS-RNTI for retransmission;

periodicity: periodicity of the configured grant Type 1;

timeDomainOffset: Offset of a resource with respect to [SFN=0] in time domain;

RRC may configure the following parameters when the configured grant Type 2 is configured:

slcs-RNTI: SLCS-RNTI for activation, deactivation, and retransmission;

periodicity: periodicity of the configured grant Type 2;

Upon configuration of a configured grant Type 1, the MAC entity shall for each configured sidelink grant:

1> initialise or re-initialise the configured sidelink grant to determine the set of PSCCH durations and the set of PSSCH durations for transmissions of multiple MAC PDUs.

When a configured sidelink grant is released by upper layers, all the corresponding configurations shall be released and all corresponding sidelink grants shall be cleared.

The MAC entity shall:

1> if the configured sidelink grant confirmation has been triggered and not cancelled; and 1> if the MAC entity has UL resources allocated for new transmission:

2> instruct the Multiplexing and Assembly procedure to generate a Configured Grant Confirmation;

2> cancel the triggered configured sidelink grant confirmation.

For a configured grant Type 2, the MAC entity shall clear the corresponding configured sidelink grant immediately after first transmission of Configured Grant Confirmation triggered by the configured sidelink grant deactivation.

In the disclosure, sidelink grant may be received dynamically on the PDCCH, configured semi-persistently by RRC or autonomously selected by the MAC entity. The MAC entity shall have a sidelink grant on an active SL BWP to determine a set of PSSCH duration(s) in which transmission of SCI occurs and a set of PSSCH duration(s) in which transmission of SL-SCH associated with the SCI occurs. To perform the requested transmissions, the MAC layer may receive HARQ information from lower layers.

If the MAC entity has a SL-RNTI or SLCS-RNTI, or the other MAC entity (i.e. E-UTRA MAC entity) has a SLCS-RNTI, the MAC entity shall for each PDCCH occasion and for each grant received for this PDCCH occasion:

1> if a sidelink grant has been received on the PDCCH for the MAC entity's SL-RNTI:

2> store the sidelink grant and the associated HARQ information as configured sidelink grant;

2> use the received sidelink grant to determine the set of PSCCH durations and the set of PSSCH durations for one or more (re-)transmissions of a single MAC PDU;

1> else if a sidelink grant has been received on the PDCCH for the MAC entity's SLCS-RNTI or the other MAC entity's SLCS-RNTI:

2> if PDCCH contents indicate configured grant Type 2 deactivation for a configured sidelink grant:

3> clear the configured sidelink grant, if available;

3> trigger configured sidelink grant confirmation for the configured sidelink grant;

2> else if PDCCH contents indicate configured grant Type 2 activation for a configured sidelink grant:

3> trigger configured sidelink grant confirmation for the configured sidelink grant;

3> initialise or re-initialise the configured sidelink grant to determine the set of PSCCH durations and the set of PSSCH durations for transmissions of multiple MAC PDUs.

If the MAC entity is configured by RRC to transmit using pool(s) of resources in a carrier based on sensing, or partial sensing, or random selection, the MAC entity shall for each Sidelink process:

1> if upper layers indicates that transmissions of multiple MAC PDUs are allowed, and the MAC entity selects to create a configured sidelink grant corresponding to transmissions of multiple MAC PDUs, and SL data is available in a logical channel:

2> perform the TX resource (re-)selection check;

2> if the TX resource (re-)selection is triggered for transmissions of multiple MAC PDUs as the result of the TX resource (re-)selection check;

3> randomly select, with equal probability, an integer value in the interval for the resource reservation interval in the interval;

3> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> randomly select the time and frequency resources for one transmission opportunity from the resources indicated by the physical layer, according to the amount of selected frequency resources.

3> use the randomly selected resource to select a set of periodic resources spaced by the resource reservation interval for transmissions of PSCCH and PSSCH corresponding to the number of transmission opportunities of MAC PDUs;

3> if one or more HARQ retransmissions are selected:

4> if there are available resources left in the resources indicated by the physical layer for more transmission opportunities:

5> randomly select the time and frequency resources for one or more transmission opportunities from the available resources, according to the amount of selected frequency resources and the selected number of HARQ retransmissions;

5> use the randomly selected resource to select a set of periodic resources spaced by the resource reservation interval for transmissions of PSCCH and PSSCH corresponding to the number of retransmission opportunities of the MAC PDUs;

5> consider the first set of transmission opportunities as the new transmission opportunities and the other set of transmission opportunities as the retransmission opportunities;

5> consider the set of new transmission opportunities and retransmission opportunities as the selected sidelink grant.

3> else:

4> consider the set as the selected sidelink grant;

3> use the selected sidelink grant to determine the set of PSCCH durations and the set of PSSCH durations;

3> consider the selected sidelink grant to be a configured sidelink grant.

1> if the MAC entity selects to create a configured sidelink grant corresponding to transmission(s) of a single MAC PDU, and SL data is available in a logical channel:

2> perform the TX resource (re-)selection check;

2> if the TX resource (re-)selection is triggered for transmission(s) of a single MAC PDU as the result of the TX resource (re-)selection check;

3> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers f CBR measurement results are available or the corresponding defaultTxConfigIndex configured by upper layers if CBR measurement results are not available;

3> elect an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> randomly select the time and frequency resources for one transmission opportunity from the resources indicated by the physical layer according to the amount of selected frequency resources.

3> if one or more HARQ retransmissions are selected:

4> if there are available resources left in the resources indicated by the physical layer for more transmission opportunities:

5> randomly select the time and frequency resources for one or more transmission opportunities from the available resources, according to the amount of selected frequency resources and the selected number of HARQ retransmissions;

5> consider a transmission opportunity which comes first in time as the new transmission opportunity and a transmission opportunity which comes later in time as the retransmission opportunity;

5> consider both of the transmission opportunities as the selected sidelink grant;

3> else:

4> consider the set as the selected sidelink grant;

3> use the selected sidelink grant to determine PSCCH duration(s) and PSSCH duration(s);

3> consider the selected sidelink grant to be a configured sidelink grant.

The MAC entity shall for each PSSCH duration:

1> for each configured sidelink grant occurring in this PSSCH duration:

2> deliver the sidelink grant and the associated HARQ information to the Sidelink HARQ Entity for this PSSCH duration.

In the disclosure, if the TX resource (re-)selection check procedure is triggered on a carrier mapped to the logical channel for a Sidelink process, the MAC entity shall for the Sidelink process:

1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 1> if neither transmission nor retransmission has been performed by the MAC entity on any resource indicated in the configured sidelink grant during the last second; or 1> if sl-ReselectAfter is configured and the number of consecutive unused transmission opportunities on resources indicated in the configured sidelink grant is equal to sl-ReselectAfter; or 1> if there is no configured sidelink grant on the carrier which is mapped to the logical channel, QoS requirement of the logical channel, the destination of the logical channel, or the cast type of the logical channel;

1> if there is no configured sidelink grant on the carrier for which HARQ feedback is enabled, in case that HARQ feedback is enabled for the logical channel; or 1> if there is no configured sidelink grant on the carrier for which HARQ feedback is disabled, in case that HARQ feedback is disabled for the logical channel; or 1> if there is no configured sidelink grant on the carrier for which the MCS level is supported, in case that the MCS level is configured for the logical channel; or 1> if there is no configured sidelink grant on the carrier for which the cast type is supported, in case that the cast type (i.e. one or more of unicast, groupcast and broadcast) is configured for the logical channel; or 1> if a pool of resources is configured or reconfigured by upper layers:

2> clear the configured sidelink grant associated to the Sidelink process, if available;

2> trigger the TX resource (re-)selection for transmissions of multiple MAC PDUs or for transmission(s) of a single MAC PDU.

1> else if a SL resource of the configured sidelink grant cannot accommodate a RLC SDU by using the maximum allowed MCS configured by upper layers in maxMCS-PSSCH and the MAC entity selects not to segment the RLC SDU; or 1> else if transmission(s) with a SL resource of the configured sidelink grant cannot fulfil the latency requirement of the data in a logical channel according to the associated priority, and the MAC entity selects not to perform transmission(s) corresponding to a single MAC PDU; or 1> else if sidelink transmission (for either LTE V2X communication or NR communication) is scheduled by the other UE with a higher priority than the priority of the logical channel and expected to overlap with a SL resource of the configured sidelink grant, and a measured result on SL-RSRP associated with the sidelink transmission is higher than threshold; or 1> else if sidelink transmission (for either LTE V2X communication or NR communication) is scheduled by the other UE with a higher priority than the priority of the logical channel and expected to overlap with a SL resource of the configured sidelink grant, and the UE cannot simultaneously receive the sidelink transmission scheduled by the other UE and perform a sidelink transmission on the SL resource at the same time; or 1> else if LTE or NR uplink transmission is scheduled for a MAC PDU of the highest logical channel priority which has a higher priority than either a threshold or the prority of the logical channel and expected to overlap with a SL resource of the configured sidelink grant, and the UE cannot simultaneously perform the uplink transmission and a sidelink transmission on the SL resource at the same time; or 1> else if one or more retransmission resources of a configured sidelink grant on the carrier are still available for next retransmission(s) of the MAC PDU that was considered as successfully transmitted (e.g. due to reception of a positive acknowledgement to a transmission of a MAC PDU); or 1> else if sidelink transmission (for either LTE V2X communication or NR communication) is scheduled by the NG-RAN with a higher priority than the prority of the logical channel and expected to overlap with a SL resource of the configured sidelink grant, and the UE cannot simultaneously perform the sidelink transmission scheduled by the NG-RAN and perform a sidelink transmission on the SL resource at the same time;

2> clear the SL resource (i.e. only part) of the configured sidelink grant associated to the Sidelink process for a carrier, if available;

2> trigger the TX resource (re-)selection for transmission(s) of a single MAC PDU on the carrier.

In the disclosure, the MAC entity may include at most one Sidelink HARQ entity for transmission on SL-SCH, which maintains a number of parallel Sidelink processes.

A sidelink process may be configured for transmissions of multiple MAC PDUs.

A delivered sidelink grant and its associated HARQ information and QoS information may be associated with a Sidelink process. Each Sidelink process may support one TB.

For each sidelink grant, the Sidelink HARQ Entity shall:

1> associate a Sidelink process to this grant, and for each associated Sidelink process:

2> if the MAC entity determines that the the sidelink grant is used for initial transmission, and if no MAC PDU has been obtained:

3> obtain the MAC PDU to transmit from the Multiplexing and assembly entity, if any;

3> if a MAC PDU to transmit has been obtained:

4> deliver the MAC PDU, the sidelink grant and the HARQ information and the QoS information of the TB to the associated Sidelink process;

4> instruct the associated Sidelink process to trigger a new transmission;

3> else:

4> flush the HARQ buffer of the associated Sidelink process.

2> else (i.e. retransmission):

3> if a positive acknowledgement to a transmission of the MAC PDU has been received; or 3> if only a negative acknowledgement is configured and no negative acknowledgement is for the most recent (re-) transmission of the MAC PDU:

4> clear the sidelink grant;

4> flush the HARQ buffer of the associated Sidelink process;

3> else:

4> deliver the sidelink grant and HARQ information and QoS information of the MAC PDU to the associated Sidelink process;

4> instruct the associated Sidelink process to trigger a retransmission.

In the disclosure, the Sidelink process may be associated with a HARQ buffer.

New transmissions and retransmissions may be performed on the resource indicated in the sidelink grant and with the MCS.

If the sidelink process is configured to perform transmissions of multiple MAC PDUs, the process may maintain a counter SL_RESOURCE_RESELECTION_COUNTER. For other configurations of the sidelink process, this counter may not be available.

If the Sidelink HARQ Entity requests a new transmission, the Sidelink process shall:

1> consider the NDI to have been toggled for the Sidelink process;

1> store the MAC PDU in the associated HARQ buffer;

1> associate the Sidelink process to a HARQ Process ID for the Source Layer-2 ID and Destination Layer-2 ID pair of the MAC PDU for one of unicast, groupcast and broadcast which is associated to the pair;

1> store the sidelink grant received from the Sidelink HARQ Entity;

1> generate a transmission as described below;

1> If the Sidelink HARQ Entity requests a retransmission, the Sidelink process shall:

1> consider the NDI to have been not toggled for the Sidelink process;

1> generate a transmission as described below;

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity (i.e. E-UTRA MAC entity) and the MAC entity are able to simultaneously perform uplink transmission(s) and sidelink transmission at the time of the transmission respectively:

2> instruct the physical layer to transmit SCI according to the stored sidelink grant with the associated HARQ information including the values of the NDI and the HARQ Process ID and the associated QoS information including the value of the highest priority of the logical channel(s) in the MAC PDU;

2> instruct the physical layer to generate a transmission according to the stored sidelink grant;

2> if HARQ feedback is configured for a logical channel from which a MAC SDU is included in the MAC PDU:

3> monitor PSFCH for the transmission.

1> if this transmission corresponds to the last transmission of the MAC PDU:

2> decrement SL_RESOURCE_RESELECTION_COUNTER by 1, if available.

In the disclosure, if the SCI associated to the PSSCH transmission indicates HARQ is enabled, the MAC entity shall for each PSSCH transmission of the MAC PDU1 carrying the logical channels:

1> for a PSFCH duration during which the MAC entity monitors PSFCH for a PSSCH transmission of the MAC PDU1 from the associated Sidelink process:

2> if the MAC entity cannot simultaneously perform PSFCH reception with a NR sidelink transmission of a MAC PDU2 of logical channels for the PSFCH duration; or 2> if the MAC entity cannot simultaneously perform PSFCH reception with a LTE sidelink transmission of a MAC PDU2 of logical channels for the PSFCH duration; or 2> if the MAC entity cannot simultaneously perform PSFCH reception with a NR uplink transmission of a MAC PDU2 of logical channels for the PSFCH duration; or 2> if the MAC entity cannot simultaneously perform PSFCH reception with a LTE uplink transmission of a MAC PDU2 of logical channels for the PSFCH duration; or 2> if the MAC entity cannot simultaneously perform PSFCH reception with a NR sidelink reception of a MAC PDU2 of logical channels for the PSFCH duration, wherein the value of the highest priority of the logical channels is indicated in the SCI scheduling the sidelink reception; or 2> if the MAC entity cannot simultaneously perform PSFCH reception with a LTE sidelink reception of a MAC PDU2 of logical channels for the PSFCH duration, wherein the value of the highest priority of the logical channels is indicated in the SCI scheduling the sidelink reception; or 2> if the MAC entity cannot simultaneously perform PSFCH reception with a NR downlink reception of a MAC PDU2 of logical channels for the PSFCH duration, wherein the value of the highest priority of the logical channels is indicated in the PDCCH scheduling the downlink reception; or 2> if the MAC entity cannot simultaneously perform PSFCH reception with a LTE downlink reception of a MAC PDU2 of logical channels for the PSFCH duration, wherein the value of the highest priority of the logical channels is indicated in the PDCCH scheduling the downlink reception:

3> if the value of the highest priority of the logical channels of the MAC PDU2 is higher than a threshold; or 3> if the value of the highest priority of the logical channels of the MAC PDU1 is lower than a threshold; or 3> if the value of the highest priority of the logical channels of the MAC PDU1 is equal to or higher than the value of the highest priority of the logical channels of the MAC PDU2;

4> instruct the physical layer to receive PSFCH for the PSFCH duration.

3> else:

4> performs the transmission or the reception overlapped with the PSFCH duration.

4> consider a negative acknowledgement is obtained from the physical layer (without actual PSFCH reception)

2> if an acknowledgement corresponding to the transmission is obtained from the physical layer:

3> deliver the acknowledgement to the corresponding Sidelink HARQ entity for the Sidelink process;

2> else:

3> deliver a negative acknowledgement to the corresponding Sidelink HARQ entity for the Sidelink process;

2> if the MAC entity has a [SL-RNTI] or [SLCS-RNTI] and a valid PUCCH resource configured for sidelink acknowledgement:

3> if the MAC entity cannot simultaneously perform the PUCCH transmission with a NR sidelink transmission of a MAC PDU2 of logical channels for the PSFCH duration; or 3> if the MAC entity cannot simultaneously perform the PUCCH transmission with a LTE sidelink transmission of a MAC PDU2 of logical channels for the PSFCH duration; or 3> if the MAC entity cannot simultaneously perform the PUCCH transmission with a NR uplink transmission of a MAC PDU2 of logical channels for the PSFCH duration; or 3> if the MAC entity cannot simultaneously perform the PUCCH transmission with a LTE uplink transmission of a MAC PDU2 of logical channels for the PSFCH duration; or 3> if the MAC entity cannot simultaneously perform the PUCCH transmission with a NR sidelink reception of a MAC PDU2 of logical channels for the PSFCH duration, wherein the value of the highest priority of the logical channels is indicated in the SCI scheduling the sidelink reception; or 3> if the MAC entity cannot simultaneously perform the PUCCH transmission with a LTE sidelink reception of a MAC PDU2 of logical channels for the PSFCH duration, wherein the value of the highest priority of the logical channels is indicated in the SCI scheduling the sidelink reception; or 3> if the MAC entity cannot simultaneously perform the PUCCH transmission with a NR downlink reception of a MAC PDU2 of logical channels for the PSFCH duration, wherein the value of the highest priority of the logical channels is indicated in the PDCCH scheduling the downlink reception; or 3> if the MAC entity cannot simultaneously perform the PUCCH transmission with a LTE downlink reception of a MAC PDU2 of logical channels for the PSFCH duration, wherein the value of the highest priority of the logical channels is indicated in the PDCCH scheduling the downlink reception:

4> if the value of the highest priority of the logical channels of the MAC PDU2 is higher than a threshold; or 4> if the value of the highest priority of the logical channels of the MAC PDU1 is lower than a threshold; or 4> if the value of the highest priority of the logical channels of the MAC PDU1 is equal to or higher than the value of the highest priority of the logical channels of the MAC PDU2;

5> prioritize the PUCCH

5> instruct the physical layer to signal the PUCCH.

4> else:

5> perform the transmission or the reception overlapped with the PUCCH resource.

5> skip the PUCCH transmission or performs the PUCCH transmission in a next time interval not overlapped with the transmission or the reception.

In the disclosure, the sidelink Logical Channel Prioritization procedure may be applied whenever a new transmission is performed.

RRC may control the scheduling of sidelink data by signalling for each logical channel:

[sl-priority] where an increasing priority value indicates a lower priority level;

[sl-prioritisedBitRate] which sets the sidelink Prioritized Bit Rate (sPBR);

[sl-bucketSizeDuration] which sets the sidelink Bucket Size Duration (sBSD).

RRC may additionally control the LCP procedure by configuring mapping restrictions for each logical channel:

[configuredSLGrantTypelAllowed] which sets whether a configured grant Type 1 can be used for sidelink transmission.

[HARQ feedback] which sets whether HARQ feedback is enabled, disabled, or both for sidelink transmission. (both indicates this logical channel can use for a transmission with or without HARQ feedback.)

The following UE variable may be used for the Logical channel prioritization procedure:

[SBj] which is maintained for each logical channel j.

The MAC entity shall initialize [SBj] of the logical channel to zero when the logical channel is established.

For each logical channel j, the MAC entity shall:

1> increment [SBj] by the product sPBR×T before every instance of the LCP procedure, where T is the time elapsed since [SBj] was last incremented;

1> if the value of [SBj] is greater than the sidelink bucket size (i.e. sPBR×sBSD):

2> set [SBj] to the sidelink bucket size.

In the disclosure, the MAC entity shall for each SCI corresponding to a new transmission:

1> if HARQ feedback is enabled for the given SL grant:

2> select a Destination associated to one of unicast, groupcast and broadcast, having the logical channel with the highest priority, among the logical channels having data available for transmission, wherein HARQ feedback is enabled for the logical channel with the highest priority for the Destination; or wherein HARQ feedback is enabled for all logical channels established for the Destination; or wherein HARQ feedback is enabled for all logical channels of priorities above a threshold for the Destination.

If multiple Destinations have the same highest priority, the MAC entity shall select one of the Destinations that has the logical channel with the highest priority and HARQ feedback set to enabled, among the logical channels having data available for transmission, or one of the Destinations that has a logical channel with HARQ feedback set to enabled, among the logical channels having data available for transmission;

2> enable HARQ feedback for the SCI for the selected Destination;

1> else if HARQ feedback is disabled for the given SL grant:

2> select a Destination associated to one of unicast, groupcast and broadcast, having the logical channel with the highest priority, among the logical channels having data available for transmission;

wherein HARQ feedback is disabled for the logical channel with the highest priority for the Destination; or wherein HARQ feedback is disabled for all logical channels established for the Destination; or wherein HARQ feedback is disabled for all logical channels of priorities above a threshold for the Destination If multiple Destinations have the same highest priority, the MAC entity shall select one of the Destinations that has the logical channel with the highest priority and HARQ feedback set to disabled, among the logical channels having data available for transmission, or one of the Destinations that has a logical channel with HARQ feedback set to disabled, among the logical channels having data available for transmission;

2> disable HARQ feedback for the SCI for the selected Destination;

1> else if HARQ feedback is neither enabled nor disabled for the given SL grant:

2> select a Destination associated to one of unicast, groupcast and broadcast, having the logical channel with the highest priority, among the logical channels having data available for transmission, If multiple Destinations have the same highest priority, the MAC entity shall select one of the Destinations that has the logical channel with the highest priority and HARQ feedback set to enabled, among the logical channels having data available for transmission, or one of the Destinations that has a logical channel with HARQ feedback set to enabled, among the logical channels having data available for transmission;

2> if a logical channel with the highest priority for the selected Destination has data available for transmission and [HARQ feedback], if configured, is set to enabled or both for the logical chanel by RRC, and if a PSFCH resource is valid for the SCI; (or if a logical channel with the highest priority for the selected Destination has data available for transmission and [HARQ feedback], if configured, is set to enabled or both for all logical chanels of priorities above a threshold for the selected Destination by RRC, and if a PSFCH resource is valid for the SCI);

3> enable HARQ feedback for the SCI for the selected Destination;

2> else:

3> disable HARQ feedback for the SCI for the selected Destination;

1> select the logical channels for each SL grant that satisfy all the following condition:

2> [configuredSLGrantTypelAllowed], if configured, is set to true in case the SL grant is a Configured Grant Type 1.

2> [HARQ feedback], if configured, is set to enabled or both in case the HARQ feedback is enabled for the SCI or the SL grant (or the selected logical channel with the highest priority having data available for transmission is configured for enabled or both);

2> [HARQ feedback], if configured, is set to disabled or both in case the HARQ feedback is disabled for the SCI or the SL grant (or the selected logical channel with the highest priority having data available for transmission is configured for disabled or both);

In the disclosure, the MAC entity shall for each SCI corresponding to a new transmission:

1> select a Destination associated to one of unicast, groupcast and broadcast, having the logical channel with the highest priority, among the logical channels having data available for transmission:

wherein the logical channel with the highest priority for the selected Destination should meet QoS requirement (e.g. when distance between the peer UEs is equal to or lower than the communication range of the logical channel with the highest priority for the selected Destination, or when the SL grant can meet delay requirement of the logical channel with the highest priority for the selected Destination) or wherein any logical channel belonging to the selected Destination should meet QoS requirement (e.g. when distance between the peer UEs is equal to or lower than the communication range of any logical channel belonging to the selected Destination, or when the SL grant can meet delay requirement of any logical channel belonging to the selected Destination) or 1> select the logical channels for each SL grant that satisfy all the following condition:

2> [configuredSLGrantTypelAllowed], if configured, is set to true in case the SL grant is a Configured Grant Type 1.

2> [Communication Range], if configured, is set to a value which is equal to or lower than the value of the communication range of the logical channel with the highest priority; (Alternatively, [Communication Range], if configured, is set to a value which is within a offset to the value of the communication range of the logical channel with the highest priority, e.g. if the highest priority LoCH1=100 m, the offset=500 m, and LoCH2=200 m, UE selects LoCH2 as well as LoCH1 for the SL grant)

2> [delay requirement], if configured, is set to a value which is equal to or lower than the value of the communication range of the logical channel with the highest priority. (Alternatively, [delay requirement], if configured, is set to a value which is within a offset to the value of the communication range of the logical channel with the highest priority e.g. if the highest priority LoCH1=100 msec, the offset=500 msec, and LoCH2=200 msec, UE selects LoCH2 as well as LoCH1 for the SL grant).

In the disclosure, the MAC entity shall for each SCI corresponding to a new transmission:

1> allocate resources to the logical channels as follows:

2> logical channels selected for the SL grant with [SBj]>0 are allocated resources in a decreasing priority order. If the SL-PBR of a logical channel is set to infinity, the MAC entity shall allocate resources for all the data that is available for transmission on the logical channel before meeting the sPBR of the lower priority logical channel(s);

2> decrement [SBj] by the total size of MAC SDUs served to logical channel j above;

2> if any resources remain, all the logical channels are served in a strict decreasing priority order (regardless of the value of [SBj]) until either the data for that logical channel or the SL grant is exhausted, whichever comes first. Logical channels configured with equal priority should be served equally. The value of [SBj] can be negative.

The UE shall also follow the rules below during the SL scheduling procedures above:

- the UE should not segment an RLC SDU (or partially transmitted SDU or retransmitted RLC PDU) if the whole SDU (or partially transmitted SDU or retransmitted RLC PDU) fits into the remaining resources of the associated MAC entity;
- if the UE segments an RLC SDU from the logical channel, it shall maximize the size of the segment to fill the grant of the associated MAC entity as much as possible;
- the UE should maximise the transmission of data;
- if the MAC entity is given a sidelink grant size that is equal to or larger than x bytes while having data available and allowed for transmission, the MAC entity shall not transmit only padding;
- A logical channel with HARQ-enabled and a logical channel with HARQ-disabled cannot be multiplexed into the same MAC PDU.

The MAC entity shall not generate a MAC PDU for the HARQ entity if the following conditions are satisfied:

- there is no aperiodic SL-CSI requested for this PSSCH transmission; and
- the MAC PDU includes zero MAC SDUs and zero MAC Control Element.

Logical channels shall be prioritised in accordance with the following order (highest priority listed first) for a cast type for a pair of Source/Destination Layer-2 IDs:

- PC5-S signaling from SCCH before PC5-RRC connection (or PC5-S unicast link establishment);
- RRC message from SCCH before PC5-RRC connection;
- RRC message except SL-CSI/RI from SCCH after PC5-RRC connection;
- PC5-S signaling from SCCH after PC5-RRC connection (or PC5-S unicast link establishment);
- MAC CE for SL-CSI/RI or a RRC message including SL-CSI/RI from SCCH;
- data from any STCH.

UE may measures sidelink transmission and report SL-CSI/RI to a peer UE via either a MAC CE or a RRC message over SCCH with RLC TM.

UE may have different priorities for PC5-S signaling (and/or RRC messages) depending on whether PC5-RRC connection or PC5-S unicast link is established or not. For example, the priority value of PC5-S signaling from SCCH before PC5-RRC connection (or PC5-S unicast link establishment) may be lower than the priority value PC5-S signaling from SCCH after PC5-RRC connection(or PC5-S unicast link establishment). Alternatively, the priority value of PC5-S signaling from SCCH before PC5-RRC connection (or PC5-S unicast link establishment) may be higher than the priority value of PC5-S signaling from SCCH after PC5-RRC connection(or PC5-S unicast link establishment). In addition, the priority value of RRC signaling from SCCH before PC5-RRC connection (or PC5-S unicast link establishment) may be lower than the priority value of RRC signaling from SCCH after PC5-RRC connection(or PC5-S unicast link establishment). Alternatively, the priority value of RRC signaling from SCCH before P6C5-RRC connection (or PC5-S unicast link establishment) may be higher than the priority value of RRC signaling from SCCH after PC5-RRC connection(or PC5-S unicast link establishment). Furthermore, the priority value of RRC signaling from SCCH before PC5-RRC connection (or PC5-S unicast link establishment) may be lower than the priority value of PC5-S signaling from SCCH after PC5-RRC connection(or PC5-S unicast link establishment). Alternatively, the priority value of RRC signaling from SCCH before PC5-RRC connection (or PC5-S unicast link establishment) may be higher than the priority value of PC5-S signaling from SCCH after PC5-RRC connection(or PC5-S unicast link establishment).

If UE measures SL-CSI/RI for a destination, and if the measured result of SL-CSI/RI is carred on MAC CE or RRC message, the priority of the MAC CE or the RRC message may be set to the hightest priority of the logical channels belonging to the destination and the associated cast type.

The priority value of a signaling may be indicated in SCI scheduling the signaling on PSSCH and also used for prioritization between UL and SL transmissions, between PUCCH transmission and SL transmission, or between PSFCH reception and SL transmission.

In the disclosure, the Sidelink Buffer Status reporting (SL-BSR) procedure may be used to provide the serving gNB with information about SL data volume in the MAC entity.

RRC may configure the following parameters to control the SL-BSR:

periodicBSR-TimerSL;

retxBSR-TimerSL;

logicalChannelSR-DelayTimerAppliedSL;

logicalChannelSR-DelayTimerSL;

logicalChannelSR-MaskSL;

logicalChannelGroupSL.

Each logical channel which belongs to a Destination may be allocated to an LCG. The maximum number of LCGs may be eight.

The MAC entity may determine the amount of SL data available for a logical channel according to the data volume calculation procedure.

A SL-BSR shall be triggered if any of the following events occur:

1> if the MAC entity has a [SL-RNTI] or [SLCS-RNTI]:

2> SL data, for a logical channel of a Destination, becomes available to the MAC entity; and either 3> this SL data belongs to a logical channel with higher priority than the priorities of the logical channels containing available SL data which belong to any LCG belonging to the same Destination; or 3> none of the logical channels which belong to an LCG belonging to the same Destination contains any available SL data.

in which case the SL-BSR is referred below to as ‘Regular SL-BSR’;

2> UL resources are allocated and number of padding bits remaining after a Padding BSR has been triggered is equal to or larger than the size of the SL-BSR MAC CE plus its subheader, in which case the SL-BSR is referred below to as ‘Padding SL-BSR’;

2> retxBSR-TimerSL expires, and at least one of the logical channels which belong to an LCG contains SL data, in which case the SL-BSR is referred below to as ‘Regular SL-BSR’;

2> periodicBSR-TimerSL expires, in which case the SL-BSR is referred below to as ‘Periodic SL-BSR’.

For Regular SL-BSR, the MAC entity shall:

1> if the SL-BSR is triggered for a logical channel for which logicalChannelSR-DelayTimerAppliedSL with value true is configured by upper layers:

2> start or restart the logicalChannelSR-DelayTimerSL.

1> else:

2> if running, stop the logicalChannelSR-DelayTimerSL.

For example, for Regular and Periodic SL-BSR, the MAC entity shall:

1> if the number of bits in the UL grant is equal to or larger than the size of a SL-BSR containing buffer status for all LCGs having data available for transmission plus its subheader:

2> report SL-BSR containing buffer status for all LCGs having data available for transmission;

1> else if at least one SL-BSR has been triggered as a Periodic SL-BSR:

2> report Truncated SL-BSR containing buffer status for as many LCGs having data available for transmission as possible, taking the number of bits in the UL grant into consideration. In this step, the MAC entity prioritizes an LCG having logical channels of which the highest priority has higher priority than the highest priority of logical channels belonging to the other LCG. Thus, the MAC entity includes an LCG in the descreasing order of the highest priority of the logical channels belonging to the LCG among all LCGs until no bits are available for an LCG in the UL grant.

1> else:

2> if at least one SL-BSR has been triggered for the logical channel of which the priority value is lower than [thresSL-TxPrioritization] and not cancelled yet; and if at least one BSR has been triggered for the logical channel of which the priority value is equal to or higher than [thresUL-TxPrioritization] and not cancelled yet: or 2> if [thresSL-TxPrioritization] is configured and the value of the highest priority of the logical channels that belong to any LCG and contain SL data for any Destination is lower than [thresSL-TxPrioritization]; and if [thresUL-TxPrioritization] is configured and the value of the highest priority of the logical channels that belong to any LCG and contain UL data is equal to or higher than [thresUL-TxPrioritization]:

3> prioritize the LCG(s) for the Destination(s);

3> report Truncated SL-BSR containing buffer status for as many prioritized LCGs having data available for transmission as possible, taking the number of bits in the UL grant into consideration;

3> prioritize the SL-BSR for logical channel prioritization;

2> else:

3> prioritize a BSR triggered for the logical channel having UL data;

3> report Truncated SL-BSR containing buffer status for as many LCGs having data available for transmission as possible, taking the number of bits in the UL grant into consideration. In this step, the MAC entity prioritizes an LCG having logical channels of which the highest priority has higher priority than the highest priority of logical channels belonging to the other LCG. Thus, the MAC entity includes an LCG in the descreasing order of the highest priority of the logical channels belonging to the LCG among all LCGs until no bits are available for an LCG in the UL grant.

Alternatively,

3> if at least one SL-BSR has been triggered for the logical channel of which the priority value is lower than [thresSL-TxPrioritization] and not cancelled yet; and if at least one BSR has been triggered for the logical channel of which the priority value is equal to or higher than [thresUL-TxPrioritization] and not cancelled yet: or 3> if [thresSL-TxPrioritization] is configured and the value of the highest priority of the logical channels that belong to any LCG and contain SL data for any Destination is lower than [thresSL-TxPrioritization]; and if [thresUL-TxPrioritization] is configured and the value of the highest priority of the logical channels that belong to any LCG and contain UL data is equal to or higher than [thresUL-TxPrioritization]:

4> prioritize the LCG(s) for the Destination(s);

4> report Truncated SL-BSR containing buffer status for all prioritized LCGs having data available for transmission and as many non-prioritized LCGs having data available for transmission as possible, taking the number of bits in the UL grant into consideration;

For Padding BSR:

1> if the number of padding bits remaining after a Padding BSR has been triggered is equal to or larger than the size of a SL-BSR containing buffer status for all LCGs having data available for transmission plus its subheader:

2> report SL-BSR containing buffer status for all LCGs having data available for transmission;

1> else:

2> if at least one SL-BSR has been triggered for the logical channel of which the priority value is lower than [thresSL-TxPrioritization] and not cancelled yet; and if at least one BSR has been triggered for the logical channel of which the priority value is equal to or higher than [thresUL-TxPrioritization] and not cancelled yet: or 2> if [thresSL-TxPrioritization] is configured and the value of the highest priority of the logical channels that belong to any LCG and contain SL data for any Destination is lower than [thresSL-TxPrioritization]; and if [thresUL-TxPrioritization] is configured and the value of the highest priority of the logical channels that belong to any LCG and contain UL data is equal to or higher than [thresUL-TxPrioritization]:

3> prioritize the LCG(s) for the Destination(s);

3> report Truncated SL-BSR containing buffer status for all prioritized LCGs having data available for transmission and as many non-prioritized LCGs having data available for transmission as possible, taking the number of bits in the UL grant into consideration. (the SL-BSR is not prioritized for logical channel prioritization)

If the MAC entity reports Truncated SL-BSR containing buffer status only for prioritized LCGs having data available for transmission as possible, taking the number of bits in the UL grant into consideration, the MAC entity may prioritize the SL-B SR for logical channel prioritization.

For SL-BSR triggered by retxBSR-TimerSL expiry, the MAC entity may consider that the logical channel that triggered the SL-BSR is the highest priority logical channel that has data available for transmission at the time the SL-BSR is triggered.

For SL-BSR triggered by periodicBSR-TimerSL expiry, the MAC entity may consider that the logical channel that triggered the SL-BSR is the highest priority logical channel that has data available for transmission at the time the SL-BSR is triggered.

The MAC entity shall:

1> if the sidelink Buffer Status reporting procedure determines that at least one SL-BSR has been triggered and not cancelled:

2> if UL-SCH resources are available for a new transmission and the UL-SCH resources can accommodate the SL-BSR MAC CE plus its subheader as a result of logical channel prioritization, and if the BSR has been triggered for the logical channel of which the priority value is equal to or higher than [thresSL-TxPrioritization] and not cancelled:

3> instruct the Multiplexing and Assembly procedure to generate the SL-BSR MAC CE(s);

3> start or restart periodicBSR-TimerSL for each destination included in the SL-BSR MAC CE(s) except when all the generated SL-BSRs are Truncated SL-BSRs;

3> start or restart retxBSR-TimerSL for each destination included in the SL-BSR MAC CE(s).

2> if a Regular SL-BSR has been triggered and logicalChannelSR-DelayTimerSL is not running:

3> if there is no UL-SCH resource available for a new transmission; or

3> if the MAC entity is configured with configured uplink grant(s) and the Regular SL-BSR was triggered for a logical channel for which logicalChannelSR-MaskSL is set to false:

4> trigger a Scheduling Request, if the BSR has been triggered for the logical channel of which the priority value is equal to or higher than [thresSL-TxPrioritization] and not cancelled yet.

UL-SCH resources may be considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one SL-BSR MAC CE, even when multiple events have triggered a SL-BSR. The Regular SL-BSR and the Periodic SL-BSR shall have precedence over the padding SL-BSR.

The MAC entity shall restart retxBSR-TimerSL upon reception of an SL grant for transmission of new data on any SL-SCH.

Alternatively, the MAC entity shall restart retxBSR-TimerSL for each destination for the associated cast type upon reception of an SL grant associated to the destination for transmission of new data on any SL-SCH for the destination.

All triggered SL-BSRs may be cancelled when the SL grant(s) can accommodate all pending data available for transmission. All BSRs triggered prior to MAC PDU assembly shall be cancelled when a MAC PDU is transmitted and this PDU includes a SL-BSR MAC CE which contains buffer status up to (and including) the last event that triggered a SL-BSR prior to the MAC PDU assembly. All triggered SL-BSRs except the SL BSR(s) not including an LCG for the QoS flow, the logical channel, the priority, the destination, or the pair of the source and the destination shall be cancelled, and the related retx-BSR-TimerSL and periodic-BSR-TimerSL shall be stopped, when upper layers configure autonomous resource selection for the QoS flow, the logical channel, the priority, the destination, or the pair of the source and the destination. Alternatively, all triggered SL-BSRs including an LCG for the QoS flow, the logical channel, the priority, the destination, or the pair of the source and the destination shall be cancelled, and the related retx-BSR-TimerSL and periodic-BSR-TimerSL shall be stopped, when upper layers configure autonomous resource selection for the QoS flow, the logical channel, the priority, the destination, or the pair of the source and the destination.

MAC PDU assembly can happen at any point in time between uplink grant reception and actual transmission of the corresponding MAC PDU. SL-BSR and SR can be triggered after the assembly of a MAC PDU which contains a SL-BSR MAC CE, but before the transmission of this MAC PDU. In addition, SL-BSR and SR can be triggered during MAC PDU assembly.

In the disclosure, for each PSSCH duration where a transmission takes place for the Sidelink process, one TB and the associated HARQ information may be received from the Sidelink HARQ Entity.

For each received TB and associated HARQ information, the Sidelink process shall:

1> if this is a new transmission:

2> attempt to decode the received data.

1> else if this is a retransmission:

2> if the data for this TB has not yet been successfully decoded:

3> instruct the physical layer to combine the received data with the data currently in the soft buffer for this TB and attempt to decode the combined data.

1> if the data which the MAC entity attempted to decode was successfully decoded for this TB; or 1> if the data for this TB was successfully decoded before:

2> if this is the first successful decoding of the data for this TB and if the DST field of the decoded MAC PDU subheader is equal to the [x] MSB of any of the Destination Layer-2 ID(s) of the UE for which the [y] LSB are equal to the Destination ID in the corresponding SCI:

3> deliver the decoded MAC PDU to the disassembly and demultiplexing entity.

1> else:

2> instruct the physical layer to replace the data in the soft buffer for this TB with the data which the MAC entity attempted to decode.

1> if HARQ feedback is configured with a separate PSFCH resource for the Sidelink process; or 1> if HARQ feedback corresponding to this TB is configured with a shared PSFCH resource and the communication range calculated based on the SCI valid for this PSSCH duration is smaller or equal to the requirement indicated in the SCI valid for this PSSCH duration:

2> instruct the physical layer to generate acknowledgement(s) of the data in this TB.

In the disclosure, the MAC subheader may comprise the following fields:

V: The MAC PDU format version number field may indicate which version of the SL-SCH subheader is used. The V field size may be 4 bits;

SRC: The Source Layer-2 ID field may carry the identity of the source. The Source Layer-2 ID is set to the identifier provided by upper layers. The SRC field size may be 24 bits;

DST: The DST field size may be 24 bits. The Destination Layer-2 ID may be set to the identifier provided by upper layers. If the V field is set to “1”, this identifier may be a unicast identifier. If the V field is set to “2”, this identifier may be a groupcast identifier. If the V field is set to “3”, this identifier may be a broadcast identifier;

LCID: The Logical Channel ID field may identify the logical channel instance within the scope of one Source Layer-2 ID and Destination Layer-2 ID pair of the corresponding MAC SDU or padding. There may be one LCID field per MAC subheader except for SL-SCH subheader. The LCID field size may be 6 bits;

L: The Length field may indicate the length of the corresponding MAC SDU in bytes. There may be one L field per MAC subheader except for subheaders corresponding to the SL-SCH subheader or padding. The size of the L field may be indicated by the F field;

F: The Format field may indicate the size of the Length field. There may be one F field per MAC subheader except for subheaders corresponding to the SL-SCH subheader or padding. The size of the F field may be 1 bit. The value 0 may indicate 8 bits of the Length field. The value 1 may indicate 16 bits of the Length field;

R: Reserved bit, set to 0.

The MAC subheader may be octet aligned.

Table 5 shows an example of values of V for SL-SCH:

TABLE 5

| Index | LCID values |
|---|---|
| 0 | Reserved |
| 1 | Unicast |
| 2 | Groupcast |
| 3 | Broadcast |

Table 6 shows an example of values of LCID for SL-SCH:

TABLE 6

| Index | LCID values |
|---|---|
| 0 | Reserved |
| 1 | SCCH carrying PC5-S signaling before PC5-RRC connection (or PC5-S unicast link establishment) |
| 2 | SCCH carrying RRC signaling before PC5-RRC connection |
| 3 | SCCH carrying PC5-S signaling after PC5-RRC connection(or PC5-S unicast link establishment) |
| 4 | SCCH carrying RRC signaling after PC5-RRC connection |
| 5 | SCCH carrying CSI/RI or MAC CE carrying CSI/RI |
| 6-21 | Identity of the logical channel |
| 22-62 | Reserved |
| 63 | Padding |

Figure 16:
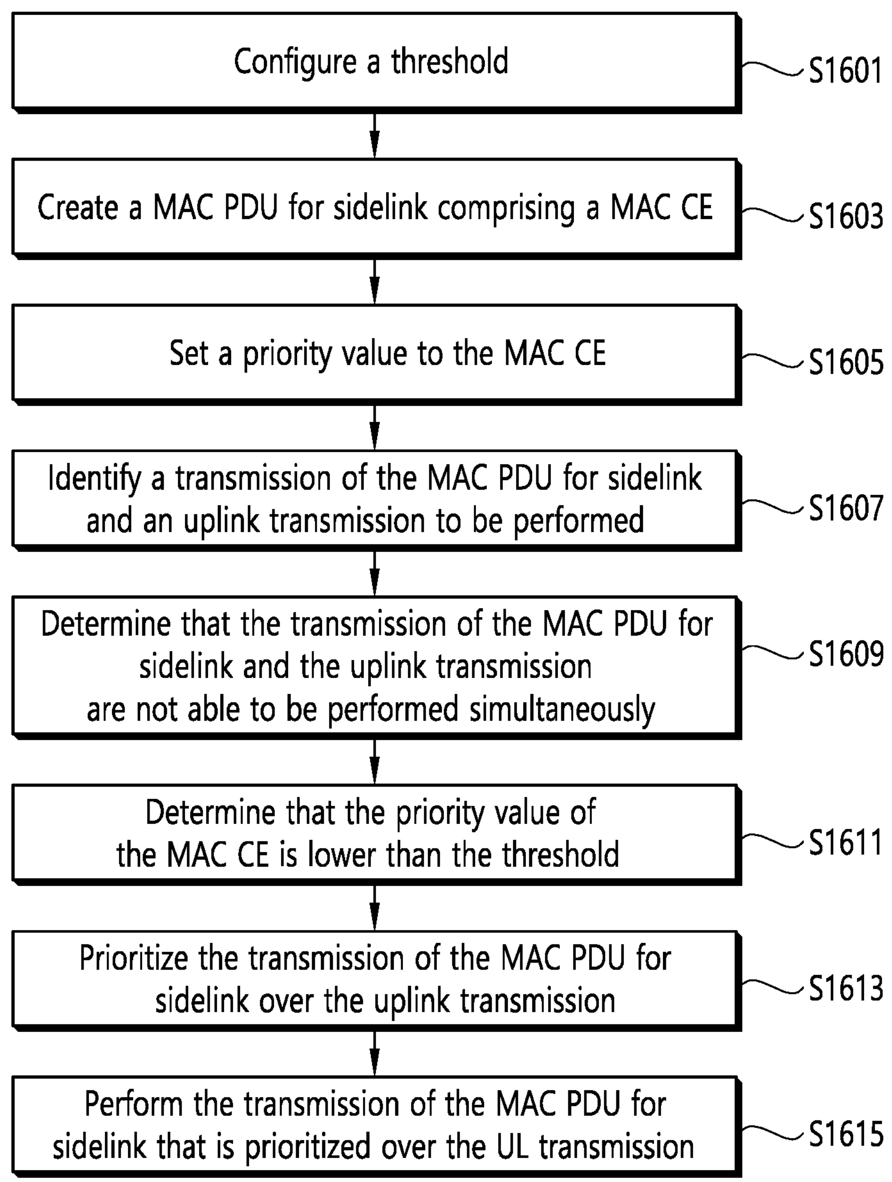
FIG. 16 shows an example of a method for prioritizing a SL MAC CE over an uplink transmission according to an embodiment of the present disclosure.

FIG. 16 shows an example of a method for prioritizing a SL MAC CE over an uplink transmission according to an embodiment of the present disclosure. Steps illustrated in FIG. 16 may be performed by at least one of a wireless device and/or a UE.Referring to FIG. 16, in step S1601, the wireless device may configure threshold. For example, the wireless device may receive a configuration of a threshold, which may comprise thresSL-TxPrioritization and/or sl-PrioritizationThres.

In step S1603, the wireless device may create a MAC PDU for sidelink comprising a MAC CE. The MAC CE may comprise CSI for sidelink.

In step S1605, the wireless device may set a priority value to the MAC CE. For example, the priority value set to the MAC CE may be a predetermined fixed value. The predetermined fixed value may be 1.

In step S1607, the wireless device may identify a transmission of the MAC PDU for sidelink and an uplink transmission to be performed.

In step S1609, the wireless device may determine that the transmission of the MAC PDU for sidelink and the uplink transmission are not able to be performed simultaneously.

In step S1611, the wireless device may determine that the priority value of the MAC CE is lower than the threshold.

In step S1613, the wireless device may prioritize the transmission of the MAC PDU for sidelink over the uplink transmission.

In step S1615, the wireless device may perform the transmission of the MAC PDU for sidelink that is prioritized over the UL transmission.

According to various embodiments, the wireless device may prioritize the transmission of the MAC PDU for sidelink over the uplink transmission based on that: i) the priority value of the MAC CE in the MAC PDU for sidelink is lower than the threshold; and ii) the transmission of the MAC PDU for sidelink and the uplink transmission are not able to be performed simultaneously.

According to various embodiments, the wireless device may prioritize the transmission of the MAC PDU for sidelink over the uplink transmission based on that the transmission of the MAC PDU for sidelink is not able to be performed simultaneously with all uplink transmissions at a time of the transmission of the MAC PDU for sidelink.

According to various embodiments, the wireless device may prioritize the transmission of the MAC PDU for sidelink over the uplink transmission based on that a value of a highest priority of logical channels and the MAC CE in the MAC PDU is lower than the threshold.

According to various embodiments, a MAC entity related to the transmission of the MAC PDU for sidelink may be different from a MAC entity related to the uplink transmission.

For example, the transmission of the MAC PDU may be prioritized over uplink transmissions of the MAC entity or the other MAC entity if the following conditions are met:

1> if the MAC entity is not able to simultaneously perform this sidelink transmission and all uplink transmissions at the time of the transmission, and 1> if uplink transmission is not prioritized; and 1> if the value of the highest priority of the logical channel(s) in the MAC PDU is lower than [thresSL-TxPrioritization] if [thresSL-TxPrioritization] is configured, or if the priority value of a MAC CE in the MAC PDU, if included, is lower than [thresSL-TxPrioritization] if [thresSL-TxPrioritization] is configured.

The priority value of the MAC CE or SCCH carrying measured result of SL-CSI/RI on sidelink transmissions for a destination to be transmitted in sidelink may be determined as:

a fixed value; or the highest priority of the sidelink transmissions used for this measured result for the destination (when a UE of the MAC entity acquires the priority of the sidelink transmission from received SCI(s) or from a PC5-RRC message sent by a peer UE); or the highest priority of the logical channels belonging to the destination regardless of whether the logical channels have data available for transmission or not If the priority value of the MAC CE is fixed, the priority value may be higher than the priority value of PC5-RRC and PC5-S and lower than a priority value of any data from STCH. (i.e. the priority level is lower than the priority level of PC5-RRC and PC5-S and higher than a priority level of any data from STCH)

If the uplink transmission is one of PUCCH transmission for SR triggered for requesting a SL-SCH resource or a UL-SCH resource, PUCCH transmission for conveying sidelink HARQ acknowledgement to NG-RAN, and MAC Control Element(s), the transmission of the MAC PDU may be prioritized over uplink transmissions of the MAC entity or the other MAC entity if the following conditions are met:

1> if the MAC entity is not able to simultaneously perform this sidelink transmission and all uplink transmissions at the time of the transmission; and 1> if uplink transmission does not include a particular MAC Control Element in their MAC PDU, except BSR MAC CE and SL-BSR MAC CE, and the particular MAC Control Element is configured by upper layers or NG-RAN; and 1> if uplink transmission does not include a BSR MAC CE and a SL-BSR MAC CE, or if uplink transmission includes a BSR MAC CE not prioritized and/or a SL-BSR MAC CE not prioritized; and 1> if uplink transmission corresponds PUCCH transmission for SR triggered for requesting a SL-SCH resource, and the SR has been triggered for a logical channel with the highest priority of which the value is higher than [thresSL-TxPrioritization] or higher than the value of the highest priority of the logical channels in the MAC PDU; and 1> if uplink transmission corresponds PUCCH transmission for SR triggered for requesting a UL-SCH resource, and the SR has been triggered for a logical channel with the highest priority of which the value is higher than [thresUL-TxPrioritization] or higher than the value of the highest priority of the logical channels in the MAC PDU; and 1> if uplink transmission corresponds PUCCH transmission for conveying sidelink HARQ acknowledgement (i.e. HARQ feedback) and the PUCCH transmission is not prioritized; and 1> if the value of the highest priority of the logical channel(s) in the MAC PDU is lower than [thresSL-TxPrioritization] if [thresSL-TxPrioritization] is configured, or if the priority value of a MAC CE in the MAC PDU, if included, is lower than [thresSL-TxPrioritization] if [thresSL-TxPrioritization] is configured.

For another example, the transmission of the MAC PDU may be prioritized over uplink transmissions of the MAC entity or the other MAC entity if the following conditions are met:

1> if the MAC entity is not able to perform this sidelink transmission simultaneously with all uplink transmissions at the time of the transmission, and 1> if uplink transmission is neither prioritized as specified in clause 5.4.2.2 nor prioritized by upper layer according to TS 23.287 [19]; and 1> if sl-P rioritizationThres is configured and if the value of the highest priority of logical channel(s) or a MAC CE in the MAC PDU is lower than sl-P rioritizationThres.

The Sidelink CSI Reporting MAC CE may be identified by a MAC subheader with LCID. The priority of the Sidelink CSI Reporting MAC CE may be fixed to '1'. The Sidelink CSI Reporting MAC CE may comprise at least one of:

RI: This field may indicate the derived value of the Rank Indicator for sidelink CSI. The length of the field may be 1 bit;

CQI: This field may indicate the derived value of the Channel Quality Indicator for sidelink CSI. The length of the field may be 4 bit; or R: Reserved bit, set to 0.

Figure 17:
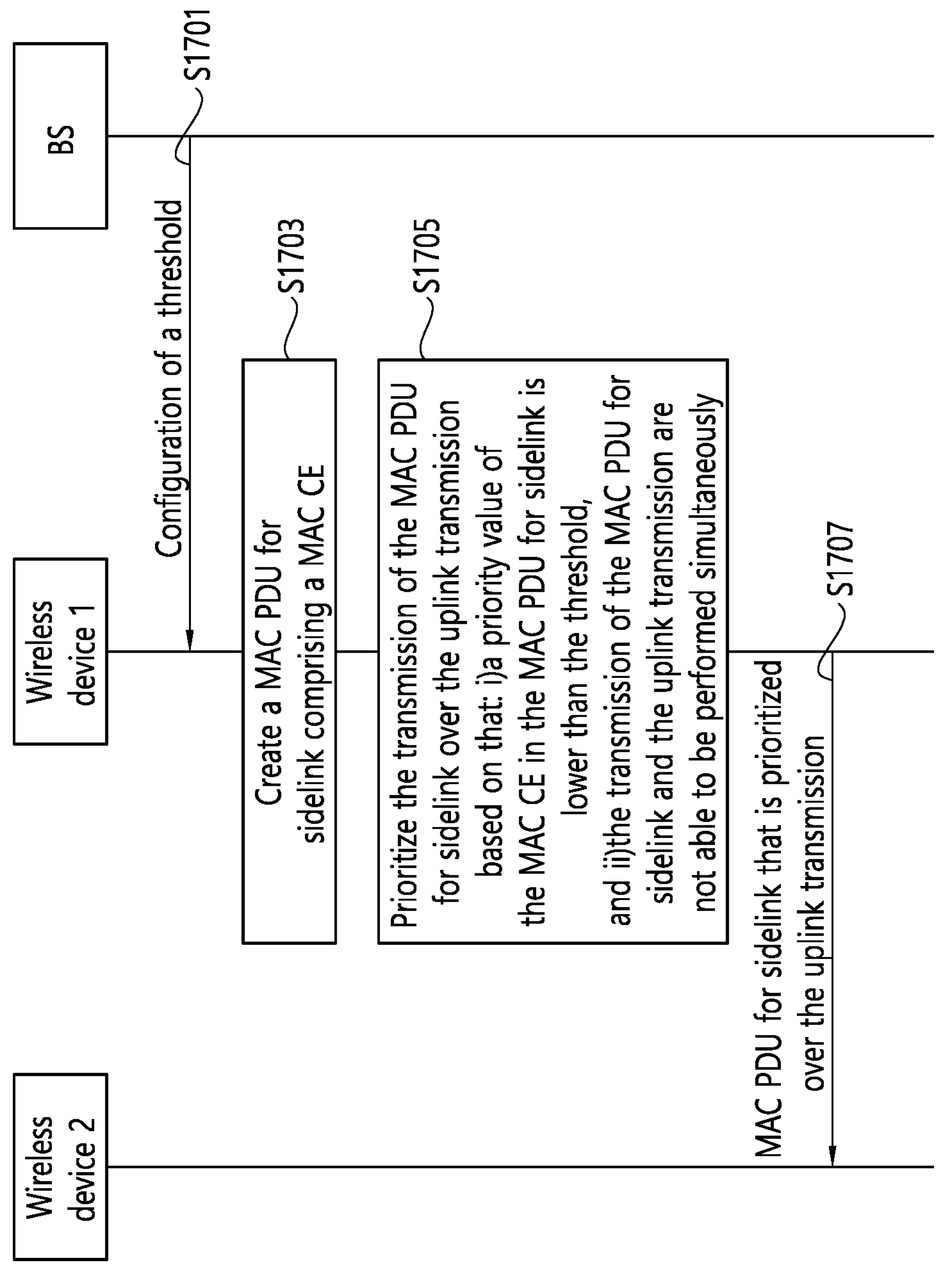
FIG. 17 shows an example of a signal flow for prioritizing a SL MAC CE over an uplink transmission according to an embodiment of the present disclosure.

FIG. 17 shows an example of a signal flow for prioritizing a SL MAC CE over an uplink transmission according to an embodiment of the present disclosure.

Referring to FIG. 17, in step S1701, a base station (BS) may transmit a configuration of a threshold to a wireless device. The threshold may comprise thresSL-TxPrioritization and/or sl-PrioritizationThres.

In step S1703, the wireless device may create a MAC PDU for sidleink comprising a MAC CE. The MAC CE may comprise CSI for sidelink.

In step S1705, the wireless device may prioritize the transmission of the MAC PDU for sidelink over the uplink transmission based on that: i) the priority value of the MAC CE in the MAC PDU for sidelink is lower than the threshold; and ii) the transmission of the MAC PDU for sidelink and the uplink transmission are not able to be performed simultaneously.

In step S1707, the wireless device may transmit, to another wireless device, the MAC PDU for sidelink that is prioritized over the uplink transmission.

The BS in FIG. 17 may be an example of a second device 220 in FIG. 2, and therefore, steps of the BS as illustrated in FIG. 17 may be implemented by the second device 220. For example, the processor 221 may be configured to control the transceiver 223 to transmit a configuration of a threshold to a wireless device. The wireless device may create a MAC PDU for sidleink comprising a MAC CE. The wireless device may prioritize the transmission of the MAC PDU for sidelink over the uplink transmission based on that: i) the priority value of the MAC CE in the MAC PDU for sidelink is lower than the threshold; and ii) the transmission of the MAC PDU for sidelink and the uplink transmission are not able to be performed simultaneously. The wireless device may transmit, to another wireless device, the MAC PDU for sidelink that is prioritized over the uplink transmission.

Figure 18:
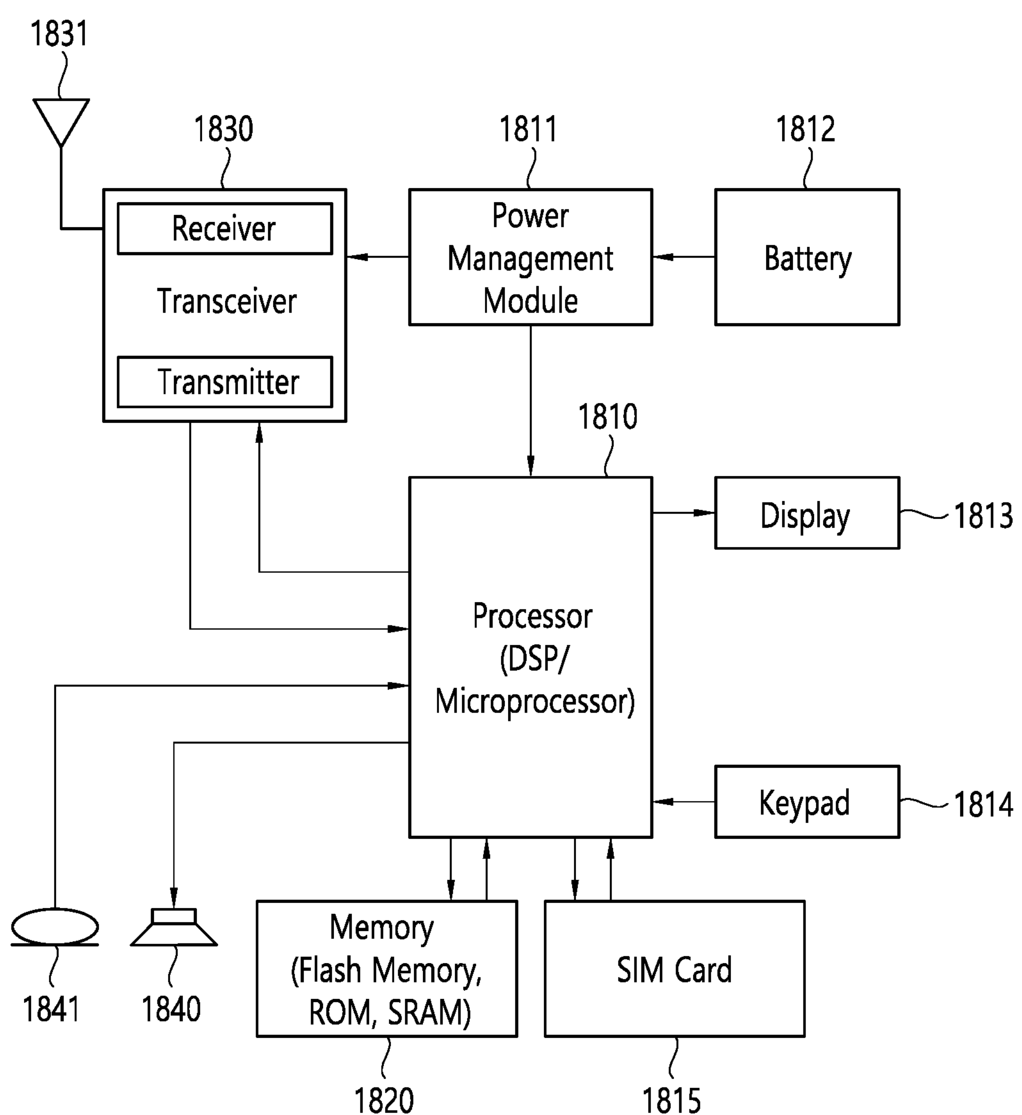
FIG. 18 shows a UE to implement an embodiment of the present disclosure.

FIG. 18 shows a UE to implement an embodiment of the present disclosure. The present disclosure described above for UE side may be applied to this embodiment. The UE in FIG. 18 may be an example of first device 218 as illustrated in FIG. 2.

A UE includes a processor 1810 (i.e., processor 211), a power management module 1811, a battery 1812, a display 1813, a keypad 1814, a subscriber identification module (SIM) card 1815, a memory 1820 (i.e., memory 212), a transceiver 1830 (i.e., transceiver 213), one or more antennas 1831, a speaker 1840, and a microphone 1841.

The processor 1810 may be configured to implement proposed functions, procedures and/or methods described in this description. Layers of the radio interface protocol may be implemented in the processor 1810. The processor 1810 may include application-specific integrated circuit (ASIC), other chipset, logic circuit and/or data processing device. The processor 1810 may be an application processor (AP). The processor 1810 may include at least one of a digital signal processor (DSP), a central processing unit (CPU), a graphics processing unit (GPU), a modem (modulator and demodulator). An example of the processor 1810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1810 may be configured to, or configured to control the transceiver 1830 to implement steps performed by the UE and/or the wireless device throughout the disclosure.

The power management module 1811 manages power for the processor 1810 and/or the transceiver 1830. The battery 1812 supplies power to the power management module 1811. The display 1813 outputs results processed by the processor 1810. The keypad 1814 receives inputs to be used by the processor 1810. The keypad 1814 may be shown on the display 1813. The SIM card 1815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1820 is operatively coupled with the processor 1810 and stores a variety of information to operate the processor 1810. The memory 1820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1820 and executed by the processor 1810. The memory 1820 can be implemented within the processor 1810 or external to the processor 1810 in which case those can be communicatively coupled to the processor 1810 via various means as is known in the art.

The transceiver 1830 is operatively coupled with the processor 1810, and transmits and/or receives a radio signal. The transceiver 1830 includes a transmitter and a receiver. The transceiver 1830 may include baseband circuitry to process radio frequency signals. The transceiver 1830 controls the one or more antennas 1831 to transmit and/or receive a radio signal.

The speaker 1840 outputs sound-related results processed by the processor 1810. The microphone 1841 receives sound-related inputs to be used by the processor 1810.

According to various embodiments, the processor 1810 may be configured to, or configured to control the transceiver 1830 to implement steps performed by the UE and/or the wireless device throughout the disclosure. For example, the processor 1810 may configured to control the transceiver 1830 to receive, from a network, a configuration of a threshold. The processor 1810 may be configured to create a MAC PDU for sidelink comprising a MAC CE. The processor 1810 may be configured to identify a transmission of the MAC PDU for sidelink and an uplink transmission to be performed. The processor 1810 may be configured to prioritize the transmission of the MAC PDU for sidelink over the uplink transmission based on that: i) the priority value of the MAC CE in the MAC PDU for sidelink is lower than the threshold; and ii) the transmission of the MAC PDU for sidelink and the uplink transmission are not able to be performed simultaneously. The processor 1810 may configured to control the transceiver 1830 to transmit the MAC PDU for sidelink that is prioritized over the uplink transmission.

According to various embodiments, the processor 1810 may be configured to prioritize the transmission of the MAC PDU for sidelink over the uplink transmission based on that the transmission of the MAC PDU for sidelink is not able to be performed simultaneously with all uplink transmissions at a time of the transmission of the MAC PDU for sidelink.

According to various embodiments, the processor 1810 may be configured to prioritize the transmission of the MAC PDU for sidelink over the uplink transmission based on that a value of a highest priority of logical channels and the MAC CE in the MAC PDU is lower than the threshold.

According to various embodiments, a MAC entity related to the transmission of the MAC PDU for sidelink may be different from a MAC entity related to the uplink transmission.

According to various embodiments, the MAC CE may comprise channel state information (CSI) for sidelink.

According to various embodiments, the priority value of the MAC CE may be a predetermined fixed value. The predetermined fixed value may be 1.

Figure 19:
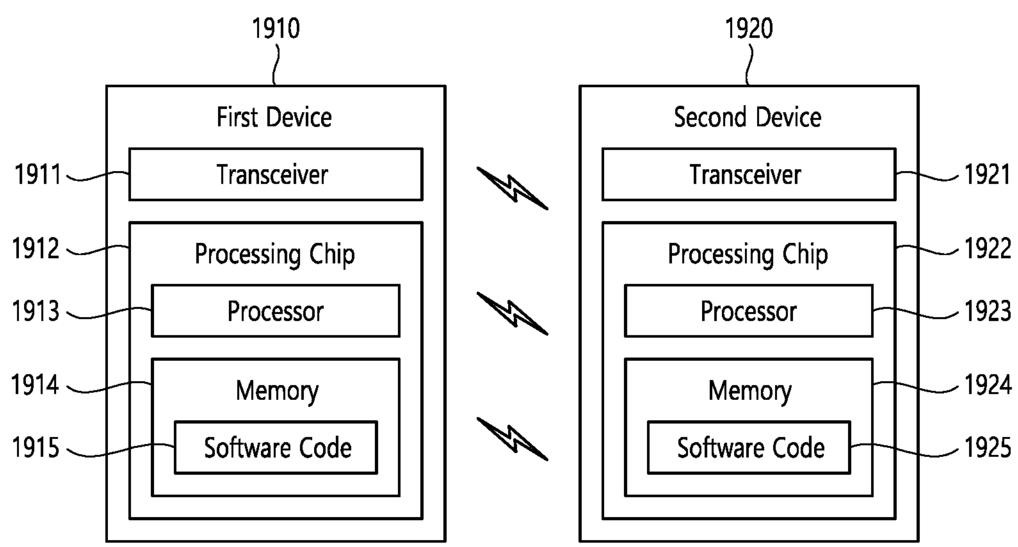
FIG. 19 shows another example of a wireless communication system to which the technical features of the present disclosure can be applied.

FIG. 19 shows another example of a wireless communication system to which the technical features of the present disclosure can be applied.

Referring to FIG. 19, the wireless communication system may include a first device 1910 (i.e., first device 210) and a second device 1920 (i.e., second device 220).

The first device 1910 may include at least one transceiver, such as a transceiver 1911, and at least one processing chip, such as a processing chip 1912. The processing chip 1912 may include at least one processor, such a processor 1913, and at least one memory, such as a memory 1914. The memory may be operably connectable to the processor 1913. The memory 1914 may store various types of information and/or instructions. The memory 1914 may store a software code 1915 which implements instructions that, when executed by the processor 1913, perform operations of the first device 910 described throughout the disclosure. For example, the software code 1915 may implement instructions that, when executed by the processor 1913, perform the functions, procedures, and/or methods of the first device 1910 described throughout the disclosure. For example, the software code 1915 may control the processor 1913 to perform one or more protocols. For example, the software code 1915 may control the processor 1913 to perform one or more layers of the radio interface protocol.

The second device 1920 may include at least one transceiver, such as a transceiver 1921, and at least one processing chip, such as a processing chip 1922. The processing chip 1922 may include at least one processor, such a processor 1923, and at least one memory, such as a memory 1924. The memory may be operably connectable to the processor 1923. The memory 1924 may store various types of information and/or instructions. The memory 1924 may store a software code 1925 which implements instructions that, when executed by the processor 1923, perform operations of the second device 1920 described throughout the disclosure. For example, the software code 1925 may implement instructions that, when executed by the processor 1923, perform the functions, procedures, and/or methods of the second device 1920 described throughout the disclosure. For example, the software code 1925 may control the processor 1923 to perform one or more protocols. For example, the software code 1925 may control the processor 1923 to perform one or more layers of the radio interface protocol.

According to various embodiments, the first device 1910 as illustrated in FIG. 19 may comprise a wireless device. The wireless device may comprise a transceiver 1911, a processing chip 1912. The processing chip 1912 may comprise a processor 1913, and a memory 1914. The memory 1914 may be operably connectable to the processor 1913. The memory 1914 may store various types of information and/or instructions. The memory 1914 may store a software code 1915 which implements instructions that, when executed by the processor 1913, perform operations comprising: configuring a threshold; creating a media access control (MAC) protocol data unit (MAC PDU) for sidelink comprising a MAC control element (CE); setting a priority value to the MAC CE; identifying a transmission of the MAC PDU for sidelink and an uplink transmission to be performed; determining that the transmission of the MAC PDU for sidelink and the uplink transmission are not able to be performed simultaneously; determining that the priority value of the MAC CE is lower than the threshold; prioritizing the transmission of the MAC PDU for sidelink over the uplink transmission; and performing the transmission of the MAC PDU for sidelink that is prioritized over the UL transmission.

According to various embodiments, a computer-readable medium having recorded thereon a program for performing each step of a method on a computer is provided. The method comprises: configuring a threshold; creating a media access control (MAC) protocol data unit (MAC PDU) for sidelink comprising a MAC control element (CE); setting a priority value to the MAC CE; identifying a transmission of the MAC PDU for sidelink and an uplink transmission to be performed; determining that the transmission of the MAC PDU for sidelink and the uplink transmission are not able to be performed simultaneously; determining that the priority value of the MAC CE is lower than the threshold; prioritizing the transmission of the MAC PDU for sidelink over the uplink transmission; and performing the transmission of the MAC PDU for sidelink that is prioritized over the UL transmission.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 20:
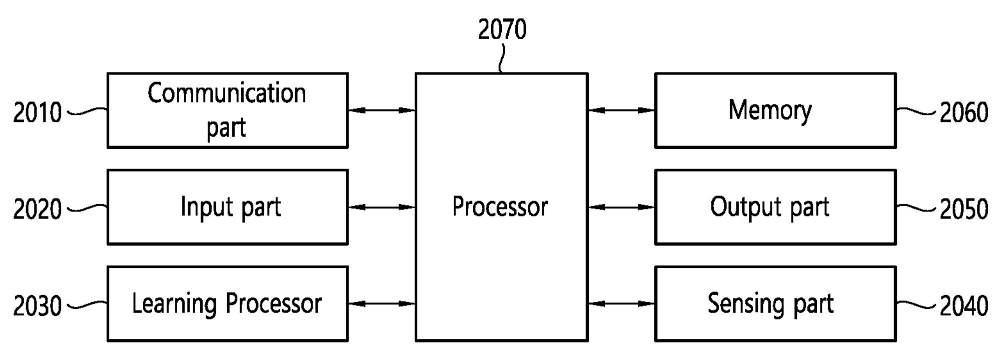
FIG. 20 shows an example of an AI device to which the technical features of the present disclosure can be applied.

FIG. 20 shows an example of an AI device to which the technical features of the present disclosure can be applied.

The AI device 2000 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 20, the AI device 2000 may include a communication part 2010, an input part 2020, a learning processor 2030, a sensing part 2040, an output part 2050, a memory 2060, and a processor 2070.

The communication part 2010 can transmit and/or receive data to and/or from external devices such as the AI devices and the AI server using wire and/or wireless communication technology. For example, the communication part 2010 can transmit and/or receive sensor information, a user input, a learning model, and a control signal with external devices. The communication technology used by the communication part 2010 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2020 can acquire various kinds of data. The input part 2020 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2020 can acquire input data to be used when acquiring an output using learning data and a learning model for model learning. The input part 2020 may obtain raw input data, in which case the processor 2070 or the learning processor 2030 may extract input features by preprocessing the input data.

The learning processor 2030 may learn a model composed of an ANN using learning data. The learned ANN can be referred to as a learning model. The learning model can be used to infer result values for new input data rather than learning data, and the inferred values can be used as a basis for determining which actions to perform. The learning processor 2030 may perform AI processing together with the learning processor of the AI server. The learning processor 2030 may include a memory integrated and/or implemented in the AI device 2000. Alternatively, the learning processor 2030 may be implemented using the memory 2060, an external memory directly coupled to the AI device 2000, and/or a memory maintained in an external device.

The sensing part 2040 may acquire at least one of internal information of the AI device 2000, environment information of the AI device 2000, and/or the user information using various sensors. The sensors included in the sensing part 2040 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2050 may generate an output related to visual, auditory, tactile, etc. The output part 2050 may include a display unit for outputting visual information, a speaker for outputting auditory information, and/or a haptic module for outputting tactile information.

The memory 2060 may store data that supports various functions of the AI device 2000. For example, the memory 2060 may store input data acquired by the input part 2020, learning data, a learning model, a learning history, etc.

The processor 2070 may determine at least one executable operation of the AI device 2000 based on information determined and/or generated using a data analysis algorithm and/or a machine learning algorithm. The processor 2070 may then control the components of the AI device 2000 to perform the determined operation. The processor 2070 may request, retrieve, receive, and/or utilize data in the learning processor 2030 and/or the memory 2060, and may control the components of the AI device 2000 to execute the predicted operation and/or the operation determined to be desirable among the at least one executable operation. The processor 2070 may generate a control signal for controlling the external device, and may transmit the generated control signal to the external device, when the external device needs to be linked to perform the determined operation. The processor 2070 may obtain the intention information for the user input and determine the user's requirements based on the obtained intention information. The processor 2070 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2030 and/or learned by the learning processor of the AI server, and/or learned by their distributed processing. The processor 2070 may collect history information including the operation contents of the AI device 2000 and/or the user's feedback on the operation, etc. The processor 2070 may store the collected history information in the memory 2060 and/or the learning processor 2030, and/or transmit to an external device such as the AI server. The collected history information can be used to update the learning model. The processor 2070 may control at least some of the components of AI device 2000 to drive an application program stored in memory 2060. Furthermore, the processor 2070 may operate two or more of the components included in the AI device 2000 in combination with each other for driving the application program.

Figure 21:
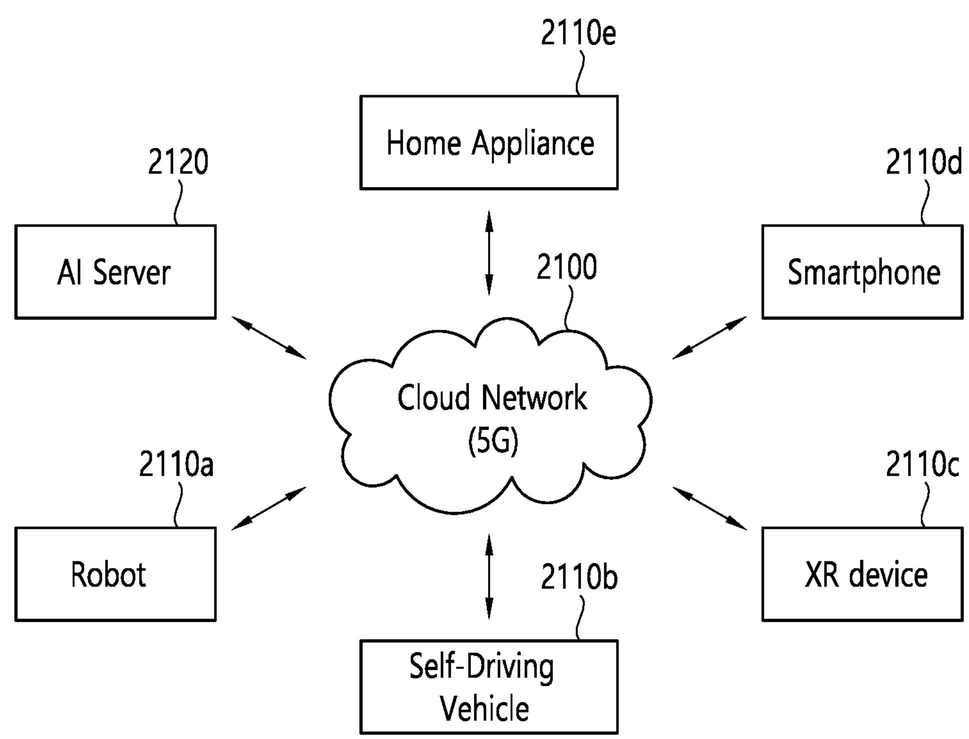
FIG. 21 shows an example of an AI system to which the technical features of the present disclosure can be applied.

FIG. 21 shows an example of an AI system to which the technical features of the present disclosure can be applied.

Referring to FIG. 21, in the AI system, at least one of an AI server 2120, a robot 2110*a*, an autonomous vehicle 2110*b*, an XR device 2110*c*, a smartphone 2110*d* and/or a home appliance 2110*e* is connected to a cloud network 2100. The robot 2110*a*, the autonomous vehicle 2110*b*, the XR device 2110*c*, the smartphone 2110*d*, and/or the home appliance 2110*e* to which the AI technology is applied may be referred to as AI devices 2110*a* to 2110*e*.

The cloud network 2100 may refer to a network that forms part of a cloud computing infrastructure and/or resides in a cloud computing infrastructure. The cloud network 2100 may be configured using a 3G network, a 4G or LTE network, and/or a 5G network. That is, each of the devices 2110*a* to 2110*e* and 2120 consisting the AI system may be connected to each other through the cloud network 2100. In particular, each of the devices 2110*a* to 2110*e* and 2120 may communicate with each other through a base station, but may directly communicate with each other without using a base station.

The AI server 2120 may include a server for performing AI processing and a server for performing operations on big data. The AI server 2120 is connected to at least one or more of AI devices constituting the AI system, i.e. the robot 2110*a*, the autonomous vehicle 2110*b*, the XR device 2110*c*, the smartphone 2110*d* and/or the home appliance 2110*e* through the cloud network 2100, and may assist at least some AI processing of the connected AI devices 2110*a* to 2110*e*. The AI server 2120 can learn the ANN according to the machine learning algorithm on behalf of the AI devices 2110*a* to 2110*e*, and can directly store the learning models and/or transmit them to the AI devices 2110*a* to 2110*e*. The AI server 2120 may receive the input data from the AI devices 2110*a* to 2110*e*, infer the result value with respect to the received input data using the learning model, generate a response and/or a control command based on the inferred result value, and transmit the generated data to the AI devices 2110*a* to 2110*e*. Alternatively, the AI devices 2110*a* to 2110*e* may directly infer a result value for the input data using a learning model, and generate a response and/or a control command based on the inferred result value.

Various embodiments of the AI devices 2110*a* to 2110*e* to which the technical features of the present disclosure can be applied will be described. The AI devices 2110*a* to 2110*e* shown in FIG. 21 can be seen as specific embodiments of the AI device 2000 shown in FIG. 20.

The present disclosure can have various advantageous effects.

For example, a UE performing channel quality reporting by using buffer status reporting can properly allocate a resource for transmission of the channel quality reporting by considering transmissions from another UE according to the present disclosure, in particular when the UE measures a channel quality from another UE.

For example, a UE can prioritize a transmission of sidleink MAC CE over uplink transmission even when the sidelink MAC CE collides with the uplink transmission.

The present disclosure is beneficial in that the system can properly allocate a resource for channel quality reporting for a UE performing sidelink transmission or reception.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:

receiving information for a threshold configured by a network;

creating a sidelink media access control (MAC) protocol data unit (PDU) comprising a MAC control element (CE) for a sidelink transmission on a sidelink shared channel (SL-SCH), wherein the MAC CE is different from sidelink logical channels including a sidelink control channel (SCCH) and a sidelink transmission channel (STCH) which are mapped to the SL-SCH;

identifying the sidelink transmission of the sidelink MAC PDU and an uplink transmission to be performed;

prioritizing the sidelink transmission of the sidelink MAC PDU over the uplink transmission based on that i) the sidelink transmission of the sidelink MAC PDU and the uplink transmission are not able to be performed simultaneously, and ii) a priority value of the MAC CE in the sidelink MAC PDU is lower than the threshold configured by the network; and performing the sidelink transmission of the sidelink MAC PDU that is prioritized over the uplink transmission.

2. The method of claim 1, wherein the sidelink transmission of the sidelink MAC PDU is prioritized over the uplink transmission based on that the sidelink transmission of the sidelink MAC PDU is not able to be performed simultaneously with all uplink transmissions at a time of the sidelink transmission of the sidelink MAC PDU.

3. The method of claim 1, wherein the sidelink transmission of the sidelink MAC PDU is prioritized over the uplink transmission based on that a value of a highest priority of logical channels and the MAC CE in the MAC PDU is lower than the threshold.

4. The method of claim 1, wherein a MAC entity related to the sidelink transmission of the sidelink MAC PDU is different from a MAC entity related to the uplink transmission.

5. The method of claim 1, wherein the MAC CE comprises channel state information (CSI) for sidelink.

6. The method of claim 5, wherein the priority value of the MAC CE is a predetermined fixed value.

7. The method of claim 6, wherein the predetermined fixed value is 1.

8. The method of claim 1, wherein the wireless device is in communication with at least one of a user equipment, a network, or autonomous vehicles other than the wireless device.

9. A wireless device in a wireless communication system comprising:

a transceiver;

a memory; and at least one processor operatively coupled to the transceiver and the memory, and configured to:

control the transceiver to receive information for a threshold configured by a network, create a sidelink media access control (MAC) protocol data unit (PDU) comprising a MAC control element (CE) for a sidelink transmission on a sidelink shared channel (SL-SCH), wherein the MAC CE is different from sidelink logical channels including a sidelink control channel (SCCH) and a sidelink transmission channel (STCH) which are mapped to the SL-SCH;

identify a sidelink transmission of the sidelink MAC PDU and an uplink transmission to be performed;

prioritize the sidelink transmission of the sidelink MAC PDU over the uplink transmission based on that i) the sidelink transmission of the sidelink MAC PDU and the uplink transmission are not able to be performed simultaneously, and ii) a priority value of the MAC CE in the sidelink MAC PDU is lower than the threshold configured by the network, and control the transceiver to perform the sidelink transmission of the sidelink MAC PDU that is prioritized over the uplink transmission.

10. The wireless device of claim 9, wherein the sidelink transmission of the sidelink MAC PDU is prioritized over the uplink transmission based on that the sidelink transmission of the sidelink MAC PDU is not able to be performed simultaneously with all uplink transmissions at a time of the sidelink transmission of the sidelink MAC PDU.

11. The wireless device of claim 9, wherein the MAC CE comprises channel state information (CSI) for sidelink, wherein the priority value of the MAC CE is a predetermined fixed value, and wherein the predetermined fixed value is 1.

12. A non-transitory computer-readable medium having recorded thereon a program for performing each step of a method on a computer, the method comprising:

receiving information for a threshold configured by a network;

creating a sidelink media access control (MAC) protocol data unit (PDU) comprising a MAC control element (CE) for a sidelink transmission on a sidelink shared channel (SL-SCH), wherein the MAC CE is different from sidelink logical channels including a sidelink control channel (SCCH) and a sidelink transmission channel (STCH) which are mapped to the SL-SCH;

identifying a sidelink transmission of the sidelink MAC PDU and an uplink transmission to be performed;

prioritizing the sidelink transmission of the sidelink MAC PDU over the uplink transmission based on that i) the sidelink transmission of the sidelink MAC PDU and the uplink transmission are not able to be performed simultaneously, and ii) a priority value of the MAC CE in the sidelink MAC PDU is lower than the threshold configured by the network; and performing the sidelink transmission of the sidelink MAC PDU that is prioritized over the uplink transmission.

* * * * *